(12) United States Patent
Kocer et al.

(10) Patent No.: US 12,714,088 B2
(45) Date of Patent: Aug. 25, 2026

(54) MODULATING NOZZLE ASSEMBLY AND METHODS FOR SAME

(71) Applicant: Raven Industries, Inc., Sioux Falls, SD (US)

(72) Inventors: Jared Ernest Kocer, Sioux Falls, SD (US); Jesse Lee Wagers, Harrisburg, SD (US); Richard Peter Muffett, Burwell (GB); Jack Michael Smart, Cambridge (GB); Demetris Stylianou, Cambridge (GB)

(73) Assignee: Raven Industries, Inc., Sioux Falls, SD (US)

( * ) Notice: Subject to any disclaimer, the term of this patent is extended or adjusted under 35 U.S.C. 154(b) by 85 days.

(21) Appl. No.: 18/604,330

(22) Filed: Mar. 13, 2024

(65) Prior Publication Data

US 2024/0307911 A1 Sep. 19, 2024

Related U.S. Application Data

(60) Provisional application No. 63/489,892, filed on Mar. 13, 2023.

(51) Int. Cl.
*A01M 7/00* (2006.01)
*B05B 1/12* (2006.01)
(Continued)

(52) U.S. Cl.
CPC .......... *A01M 7/0089* (2013.01); *A01M 7/005* (2013.01); *B05B 1/12* (2013.01);
(Continued)

(58) Field of Classification Search
CPC .. A01M 7/0042; A01M 7/0089; A01M 7/005; B05B 1/12; B05B 1/16;
(Continued)

(56) References Cited

U.S. PATENT DOCUMENTS 1,582,986 A 5/1926 Frank
1,947,407 A 2/1934 Cornell, Jr.
(Continued)

FOREIGN PATENT DOCUMENTS

AU 725448 10/2000
AU 2004219715 9/2004
(Continued)

OTHER PUBLICATIONS

"European Application Serial No. 24174311.1, Extended European Search Report mailed Jul. 10, 2024", 5 pgs.
(Continued)

*Primary Examiner* — Kyle Robert Thomas
(74) *Attorney, Agent, or Firm* — Schwegman Lundberg & Woessner, P.A.

(57) ABSTRACT

A modulating nozzle assembly for use with an agricultural sprayer includes a nozzle base having a base edge. A spray modulating element, such as a shuttle, is movably coupled with the nozzle base. The shuttle includes a shuttle edge. A spray port is between the nozzle base and the shuttle. The spray port includes a spray port profile, and the spray port profile is formed by the base edge and the shuttle edge. A modulation actuator is coupled with the shuttle, the modulation actuator is configured to move one or more of the shuttle edge or the base edge relative to the other of the base edge or the shuttle edge to control the spray port profile.

25 Claims, 12 Drawing Sheets

(51) Int. Cl.

| | |
|---|---|
| ***B05B 1/16*** | (2006.01) |
| ***B05B 1/30*** | (2006.01) |
| ***B05B 1/32*** | (2006.01) |
| ***B05B 3/18*** | (2006.01) |
| ***B05B 12/00*** | (2018.01) |
| ***B05B 12/08*** | (2006.01) |

(52) U.S. Cl.
CPC ............. *B05B 1/16* (2013.01); *B05B 1/1645* (2013.01); *B05B 1/3026* (2013.01); *B05B 1/3073* (2013.01); *B05B 1/326* (2013.01); *B05B 3/18* (2013.01); *B05B 12/006* (2013.01); *B05B 12/082* (2013.01); *B05B 12/085* (2013.01); *A01M 7/0042* (2013.01)

(58) Field of Classification Search
CPC ... B05B 1/1645; B05B 1/3026; B05B 1/3073; B05B 1/32; B05B 1/326; B05B 3/18; B05B 12/006; B05B 12/082; B05B 12/085
See application file for complete search history.

(56) References Cited

U.S. PATENT DOCUMENTS 3,197,299 A 7/1965 Bosse et al.
3,770,198 A 11/1973 Mihara
3,955,795 A 5/1976 Neely
4,283,010 A 8/1981 Arzi et al.
4,356,528 A 10/1982 Coffee
4,398,605 A 8/1983 Conklin et al.
4,530,463 A 7/1985 Hiniker et al.
4,582,085 A 4/1986 Hafner et al.
4,632,358 A 12/1986 Orth et al.
4,803,626 A 2/1989 Bachman et al.
4,970,973 A 11/1990 Lyle et al.
5,134,961 A 8/1992 Giles et al.
5,285,814 A 2/1994 Pettersson et al.
5,310,113 A 5/1994 Cowgur
5,337,959 A 8/1994 Boyd
5,475,614 A 12/1995 Tofte et al.
5,479,812 A 1/1996 Juntunen et al.
5,496,100 A 3/1996 Schmid
5,503,366 A 4/1996 Zabeck et al.
5,520,333 A 5/1996 Tofte
5,615,836 A 4/1997 Graef
5,635,911 A 6/1997 Landers et al.
5,649,687 A 7/1997 Rosas et al.
5,653,389 A 8/1997 Henderson et al.
5,703,554 A 12/1997 Polgar et al.
5,704,546 A 1/1998 Henderson et al.
5,772,114 A 6/1998 Hunter
5,785,246 A 7/1998 King et al.
5,801,948 A 9/1998 Wood et al.
5,864,781 A 1/1999 White
5,881,919 A 3/1999 Womac et al.
5,883,383 A 3/1999 Dragne
5,884,205 A 3/1999 Elmore et al.
5,884,224 A 3/1999 McNabb et al.
5,897,600 A 4/1999 Elmore et al.
5,911,362 A 6/1999 Wood et al.
5,913,915 A 6/1999 McQuinn
5,919,242 A 7/1999 Greatline et al.
5,924,371 A 7/1999 Flamme et al.
5,931,882 A 8/1999 Fick et al.
5,936,234 A 8/1999 Thomas et al.
5,938,071 A 8/1999 Sauder
5,941,303 A 8/1999 Gowan et al.
5,967,066 A 10/1999 Giles et al.
5,969,340 A 10/1999 Dragne et al.
5,971,294 A 10/1999 Thompson et al.
5,978,723 A 11/1999 Hale et al.
6,009,354 A 12/1999 Flamme et al.
6,012,996 A 1/2000 Lo
6,029,907 A 2/2000 McKenzie
6,070,538 A 6/2000 Flamme et al.
6,070,539 A 6/2000 Flamme et al.
6,079,340 A 6/2000 Flamme et al.
6,086,042 A 7/2000 Scott et al.
6,089,743 A 7/2000 Mcquinn et al.
6,093,926 A 7/2000 Mertins et al.
6,112,999 A 9/2000 Fingleton et al.
6,122,581 A 9/2000 McQuinn
6,138,922 A 10/2000 Hartman et al.
6,145,455 A 11/2000 Gust et al.
6,149,071 A 11/2000 Maccallummhor et al.
6,189,466 B1 2/2001 Sinclair et al.
6,189,807 B1 2/2001 Miller et al.
6,196,473 B1 3/2001 Beeren et al.
6,199,000 B1 3/2001 Keller et al.
6,209,563 B1 4/2001 Seid et al.
6,216,614 B1 4/2001 Wollenhaupt
6,230,091 B1 5/2001 McQuinn et al.
6,236,924 B1 5/2001 Motz et al.
6,240,861 B1 6/2001 Memory
6,250,564 B1 6/2001 Chahley
6,269,757 B1 8/2001 Kiest
6,285,938 B1 9/2001 Lang et al.
6,305,583 B1 10/2001 Ward et al.
6,373,057 B1 4/2002 Penfold
6,486,761 B1 11/2002 Czarnetzki et al.
6,522,948 B1 2/2003 Benneweis
6,533,334 B1 3/2003 Bonn
6,584,920 B1 7/2003 Cresswell
6,598,944 B1 7/2003 Wolff et al.
6,606,542 B2 8/2003 Hauwiller et al.
6,661,514 B1 12/2003 Tevs et al.
6,666,384 B2 12/2003 Prandi
6,678,580 B2 1/2004 Benneweis
6,698,368 B2 3/2004 Cresswell
6,708,080 B2 3/2004 Benneweis
6,720,684 B2 4/2004 Czimmek
6,755,390 B2 6/2004 Masuda et al.
6,776,355 B2 8/2004 Ringer et al.
6,851,377 B2 2/2005 Mayerle et al.
6,853,276 B2 2/2005 Smith
6,877,675 B2 4/2005 Benneweis
6,877,717 B2 4/2005 Collins et al.
6,959,907 B2 11/2005 Hironaka
6,994,406 B1 2/2006 Krawczyk et al.
7,124,964 B2 10/2006 Bui
7,147,241 B2 12/2006 Beaujot et al.
7,152,540 B1 12/2006 Sauder et al.
7,156,322 B1 1/2007 Heitzman et al.
7,162,961 B2 1/2007 Grimm
7,195,027 B2 3/2007 Goossens et al.
7,243,899 B2 7/2007 Acar et al.
7,311,004 B2 12/2007 Giles
7,347,221 B2 3/2008 Berger et al.
7,395,769 B2 7/2008 Jensen
7,441,746 B2 10/2008 Sugiyama
7,472,660 B2 1/2009 Mariman et al.
7,478,603 B2 1/2009 Riewerts et al.
7,490,564 B2 2/2009 Allan et al.
7,502,665 B2 3/2009 Giles et al.
7,626,288 B2 12/2009 Protze
7,654,473 B2 2/2010 Hibberd
7,685,951 B2 3/2010 Beaujot et al.
7,690,440 B2 4/2010 Dean et al.
7,694,638 B1 4/2010 Riewerts et al.
7,706,926 B2 4/2010 Peterson
7,742,842 B2 6/2010 Giles et al.
7,789,321 B2 9/2010 Hitt
7,826,930 B2 11/2010 Giles et al.
7,845,914 B2 12/2010 Engelbrecht et al.
7,848,865 B2 12/2010 Di Federico et al.
7,917,249 B2 3/2011 Jacobsen et al.
7,954,731 B2 6/2011 Antonucci et al.
8,078,367 B2 12/2011 Sauder et al.
8,109,448 B2 2/2012 Giles
8,141,504 B2 3/2012 Dean et al.
8,170,825 B2 5/2012 Beaujot et al.
8,186,288 B2 5/2012 Chinkiwsky

(56) References Cited

U.S. PATENT DOCUMENTS 8,191,795 B2 6/2012 Grimm et al.
8,191,798 B2 6/2012 Hahn et al.
8,196,534 B2 6/2012 Meyer et al.
8,246,004 B2 8/2012 Kratzer
8,401,704 B2 3/2013 Pollock et al.
8,488,874 B2 7/2013 Zaman et al.
8,523,085 B2 9/2013 Grimm et al.
8,590,859 B2 11/2013 Kurz
8,634,993 B2 1/2014 McClure
8,635,963 B2 1/2014 Friggstad
8,701,707 B2 4/2014 Moosmann et al.
8,733,257 B2 5/2014 Beaujpt et al.
8,733,259 B2 5/2014 Beaujot
8,739,830 B2 6/2014 Bradbury et al.
8,825,310 B2 9/2014 Kowalchuk
8,844,838 B2 9/2014 Funseth et al.
8,868,300 B2 10/2014 Kocer et al.
8,915,200 B2 12/2014 Barsi et al.
8,919,676 B2 12/2014 Funseth et al.
9,052,031 B2 6/2015 Leidig
9,061,296 B2 6/2015 Peterson
9,073,070 B2 7/2015 Funseth et al.
9,080,684 B2 7/2015 Stahr
9,113,591 B2 8/2015 Shivak
9,144,190 B2 9/2015 Henry et al.
9,266,124 B2 2/2016 Humpal
9,453,585 B2 9/2016 Sato et al.
9,470,332 B2 10/2016 Miura
9,504,212 B2 11/2016 Michael et al.
9,506,578 B2 11/2016 Lee
9,635,848 B2 5/2017 Needham et al.
9,702,475 B2 7/2017 Scheffel et al.
9,781,916 B2 10/2017 Preheim et al.
9,894,829 B2 2/2018 Shivak
10,058,879 B2 8/2018 Needham
10,173,236 B2 1/2019 Preheim et al.
10,189,031 B2 1/2019 Funseth et al.
10,368,538 B2 8/2019 Preheim et al.
10,518,284 B2 12/2019 Thurow et al.
10,568,257 B2 2/2020 Shivak
10,773,271 B2 * 9/2020 Funseth .............. A01M 7/0089
10,799,898 B2 10/2020 Posselius et al.
10,821,460 B2 11/2020 Batcheller et al.
11,051,505 B2 7/2021 Humpal et al.
11,071,247 B2 7/2021 Shivak et al.
11,130,573 B2 * 9/2021 Holly ..................... B64U 10/17
11,134,668 B2 10/2021 Preheim et al.
11,160,204 B2 11/2021 Michael
11,236,841 B2 2/2022 Krosschell et al.
11,612,160 B2 3/2023 Krosschell et al.
11,744,239 B2 9/2023 Kocer et al.
12,016,326 B2 6/2024 Kocer et al.
2002/0030119 A1 3/2002 Proharam
2002/0107609 A1 8/2002 Benneweis
2003/0028321 A1 2/2003 Upadhyaya et al.
2003/0070597 A1 4/2003 Cresswell
2003/0234301 A1 12/2003 Swan
2004/0036048 A1 2/2004 Petersen
2004/0104370 A1 6/2004 Suzuki
2004/0128045 A1 7/2004 Benneweis
2005/0000277 A1 1/2005 Giles
2005/0048196 A1 3/2005 Yanagita et al.
2005/0051749 A1 3/2005 Lee
2005/0076818 A1 4/2005 Grimm
2005/0092951 A1 5/2005 Groetzinger
2005/0125083 A1 6/2005 Kiko
2005/0173979 A1 8/2005 Voss
2006/0086295 A1 4/2006 Jensen
2006/0097210 A1 5/2006 Fong et al.
2006/0194699 A1 8/2006 Moucharafieh et al.
2006/0237562 A1 10/2006 Hedegard
2006/0265106 A1 11/2006 Giles et al.
2006/0273189 A1 12/2006 Grimm et al.
2007/0039880 A1 2/2007 Mayerle
2007/0128372 A1 6/2007 Wirth et al.
2008/0110476 A1 5/2008 Amestoy et al.
2008/0114497 A1 5/2008 Giles et al.
2008/0114498 A1 5/2008 Giles
2008/0147282 A1 6/2008 Kormann
2008/0163807 A1 7/2008 Dean et al.
2008/0230624 A1 9/2008 Giles et al.
2008/0283633 A1 11/2008 Nozaki et al.
2008/0296398 A1 12/2008 Hickman et al.
2009/0078178 A1 3/2009 Beaujot
2009/0101371 A1 4/2009 Melanson et al.
2009/0112372 A1 4/2009 Peterson
2009/0114210 A1 5/2009 Guice et al.
2009/0134237 A1 5/2009 Giles
2009/0184182 A1 7/2009 Beeren
2009/0271136 A1 10/2009 Beaujot et al.
2010/0032492 A1 2/2010 Grimm et al.
2010/0096476 A1 4/2010 Callies et al.
2010/0101469 A1 4/2010 Landphair et al.
2010/0132600 A1 6/2010 Dean et al.
2010/0163774 A1 7/2010 Rimboym et al.
2010/0269921 A1 10/2010 Pifer et al.
2011/0054743 A1 3/2011 Kocer et al.
2011/0160920 A1 6/2011 Orr et al.
2011/0179984 A1 7/2011 Beaujot et al.
2011/0204272 A1 8/2011 Kratzer
2011/0210186 A1 9/2011 Kugler et al.
2012/0045013 A1 2/2012 Chen et al.
2012/0080624 A1 4/2012 Stahr et al.
2012/0153051 A1 6/2012 Kah, Jr. et al.
2012/0168530 A1 7/2012 Ellingson et al.
2012/0169495 A1 7/2012 Kowalchuk
2012/0174843 A1 7/2012 Friggstad
2012/0195496 A1 8/2012 Zaman et al.
2012/0211508 A1 8/2012 Barsi et al.
2012/0216732 A1 8/2012 Ballard et al.
2012/0228395 A1 9/2012 Needham
2012/0241533 A1 9/2012 Moeller et al.
2012/0271467 A1 10/2012 Grimm et al.
2013/0032737 A1 2/2013 Neilson et al.
2013/0037633 A1 2/2013 Walter et al.
2013/0092746 A1 4/2013 Scott et al.
2013/0119154 A1 5/2013 Sawyer
2013/0192503 A1 8/2013 Henry et al.
2013/0269578 A1 10/2013 Grimm
2013/0292590 A1 11/2013 Stahr
2013/0306894 A1 11/2013 Weis et al.
2013/0320105 A1 12/2013 Schmidt
2013/0320106 A1 12/2013 Schmidt
2013/0333601 A1 12/2013 Shivak
2014/0014863 A1 1/2014 Najmolhoda et al.
2014/0026995 A1 1/2014 Mayr et al.
2014/0048002 A1 2/2014 Grimm et al.
2014/0084196 A1 3/2014 Heyer et al.
2014/0091243 A1 4/2014 Leidig
2014/0216315 A1 8/2014 Beaujot et al.
2014/0252111 A1 9/2014 Michael et al.
2014/0263705 A1 9/2014 Michael et al.
2014/0263708 A1 9/2014 Thompson et al.
2014/0263709 A1 9/2014 Kocer et al.
2014/0277780 A1 9/2014 Jensen et al.
2014/0299673 A1 10/2014 Grimm et al.
2014/0312141 A1 10/2014 Ravishankar
2014/0333398 A1 11/2014 Nila et al.
2014/0361094 A1 12/2014 Michael
2015/0115058 A1 4/2015 Wilger
2015/0257331 A1 9/2015 Shivak
2015/0336116 A1 11/2015 Gerdes
2015/0367352 A1 12/2015 Burchardt
2015/0367357 A1 12/2015 Humpal et al.
2015/0367358 A1 12/2015 Funseth et al.
2015/0375247 A1 12/2015 Funseth et al.
2016/0015020 A1 1/2016 Needham et al.
2016/0017792 A1 1/2016 Fletcher et al.
2016/0044862 A1 2/2016 Kocer et al.
2016/0084382 A1 3/2016 Pisasale
2016/0136671 A1 5/2016 Kocer
2016/0175869 A1 6/2016 Sullivan et al.
2016/0178422 A1 6/2016 Humpal et al.
2016/0227755 A1 8/2016 Preheim et al.

(56) References Cited

U.S. PATENT DOCUMENTS

2016/0251008 A1 9/2016 Jeon et al.
2017/0018345 A1 1/2017 Raff et al.
2017/0050206 A1 2/2017 Bullock et al.
2017/0079200 A1 3/2017 Posselius et al.
2017/0095834 A1 4/2017 Kinard
2017/0120263 A1 5/2017 Needham
2017/0251656 A1 9/2017 Kolb et al.
2017/0284285 A1 10/2017 Lenk et al.
2017/0314580 A1 11/2017 Steensma et al.
2017/0348718 A1 12/2017 Preheim et al.
2018/0042214 A1 2/2018 Preheim et al.
2018/0111148 A1 4/2018 Batcheller et al.
2018/0288934 A1 10/2018 Shivak
2019/0029170 A1 1/2019 Wilger
2019/0040972 A1 2/2019 Schrader
2019/0047694 A1 2/2019 Zivan et al.
2019/0321844 A1 10/2019 Schrader et al.
2019/0350187 A1 11/2019 Kocer et al.
2019/0373880 A1 12/2019 Kocer et al.
2020/0037519 A1 2/2020 Wonderlich et al.
2020/0101480 A1 4/2020 Schrader et al.
2020/0107538 A1 4/2020 Preheim et al.
2020/0113170 A1 4/2020 Davis et al.
2020/0113171 A1 4/2020 Davis et al.
2020/0214193 A1 7/2020 Shivak
2020/0221682 A1 7/2020 Grimm et al.
2020/0253111 A1 8/2020 Schlipf et al.
2021/0016309 A1 1/2021 Bremer et al.
2021/0076977 A1 3/2021 Abeyratne et al.
2021/0102637 A1 4/2021 Krosschell et al.
2021/0144906 A1 5/2021 Shivak et al.
2021/0176977 A1* 6/2021 Bremer .................. B05B 12/08
2021/0219538 A1 7/2021 Krosschell et al.
2021/0282315 A1 9/2021 Charcosset
2021/0289693 A1 9/2021 Harmon et al.
2021/0289766 A1 9/2021 Long et al.
2021/0293256 A1 9/2021 Long et al.
2021/0400946 A1 12/2021 Burgers et al.
2022/0062934 A1 3/2022 Ferren et al.
2022/0079132 A1 3/2022 Preheim et al.
2022/0088627 A1 3/2022 Chaim et al.
2022/0099213 A1 3/2022 Krosschell et al.
2022/0104427 A1 4/2022 Michael
2022/0124962 A1 4/2022 Long et al.
2023/0022504 A1 1/2023 Maurer et al.
2023/0049963 A1 2/2023 Kocer et al.
2023/0141050 A1 5/2023 Sibley et al.
2023/0141867 A1 5/2023 Krosschell et al.
2023/0189785 A1 6/2023 Harmon et al.
2023/0278009 A1 9/2023 Abe et al.
2024/0130347 A1 4/2024 Kocer et al.
2024/0424506 A1 12/2024 Kocer
2025/0064046 A1 2/2025 Kocer et al.

FOREIGN PATENT DOCUMENTS

AU 2005247004 12/2006
AU 2006202376 B2 12/2006
AU 2009203181 A1 2/2010
AU 2012201357 A1 9/2012
AU 2013203361 A1 10/2013
AU 2013204455 A1 3/2014
AU 2013248190 5/2014
AU 2013277513 B2 3/2017
AU 2017285727 B2 7/2020
AU 2020357581 B2 8/2023
AU 2021209314 B2 8/2023
AU 2023214344 A1 8/2023
AU 2023258379 7/2025
BR 112022026505 A2 5/2023
CA 2229852 A1 8/1998
CA 2517031 A1 9/2004
CA 2528708 A1 11/2006
CA 2549300 A1 12/2006
CA 2674527 A1 2/2010
CA 2770013 A1 9/2012
CA 2811726 A1 10/2013
CA 2813949 A1 2/2014
CA 2830306 4/2014
CA 2926448 A1 4/2015
CA 2926448 C 9/2020
CA 3049421 C 3/2023
CN 102435019 A 5/2012
CN 202255911 U 5/2012
CN 102266829 B 12/2012
CN 203264929 U 11/2013
DE 102011053182 3/2013
DE 112017003084 T5 6/2019
EP 0086029 8/1983
EP 0287552 10/1988
EP 0576121 B1 3/1996
EP 969712 1/2000
EP 0961659 B1 10/2002
EP 0963255 B1 10/2002
EP 0847307 B2 1/2003
EP 0837735 2/2004
EP 1426112 B1 6/2011
EP 2249876 8/2012
EP 3248463 A1 11/2017
EP 3530115 8/2019
EP 3565398 B1 6/2024
FR 2964047 A1 3/2012
GB 990346 A 4/1965
GB 2322573 A 9/1998
JP 2759711 B2 5/1998
JP 2000139245 A 5/2000
JP 2005161221 A 6/2005
JP 2010127694 A 6/2010
WO WO-9712688 A1 4/1997
WO WO1997012688 A1 4/1997
WO WO-98037751 9/1998
WO WO-9842178 A1 10/1998
WO WO9916007 A1 4/1999
WO WO-1999016007 A1 4/1999
WO WO-2004023865 3/2004
WO WO-2004081499 9/2004
WO WO-2005048704 A2 6/2005
WO WO-2008059984 A1 5/2008
WO WO-2008112930 A1 9/2008
WO WO-2010105221 A1 9/2010
WO WO-2012022903 A1 2/2012
WO WO-2013135430 A1 9/2013
WO WO-2013191990 A2 12/2013
WO WO-2013191990 A3 12/2013
WO WO-2014201008 A1 12/2014
WO WO-2014210043 A1 12/2014
WO WO-2015058091 A1 4/2015
WO WO-2016030368 A1 3/2016
WO WO-2016145081 A2 9/2016
WO WO-2017124175 A1 7/2017
WO WO-2017192625 A1 11/2017
WO WO-2017223252 A1 12/2017
WO WO-2018129323 A1 7/2018
WO WO-2018129376 A2 7/2018
WO WO-2018129376 A3 7/2018
WO WO-2020252239 A1 12/2020
WO WO-2021066962 A1 4/2021
WO WO-2021263024 A1 12/2021
WO WO-2022094138 A1 5/2022
WO WO-2022216285 A1 10/2022
WO WO-2023278009 A1 1/2023
WO WO-2023081371 A1 5/2023
WO 2023110427 6/2023
WO 2024192167 9/2024
WO 2024263873 12/2024
WO 2025049306 3/2025

OTHER PUBLICATIONS

"Canadian Application Serial No. 3,185,961, Response filed Aug. 12, 2024 to Examiners Rule 86(2) Report mailed May 6, 2024", 8 pgs.

(56) References Cited

OTHER PUBLICATIONS

"U.S. Appl. No. 18/355,926, Restriction Requirement mailed Aug. 30, 2024", 10 pgs.
"U.S. Appl. No. 17/809,223, Examiner Interview Summary mailed Sep. 10, 2024", 3 pgs.
"U.S. Appl. No. 17/809,223, Response filed Sep. 13, 2024 to Final Office Action mailed Jun. 13, 2024", 18 pgs.
"U.S. Appl. No. 17/809,223, Advisory Action mailed Sep. 18, 2024", 3 pgs.
"International Application Serial No. PCT US2024 034956, International Search Report mailed Oct. 8, 2024", 5 pgs.
"International Application Serial No. PCT US2024 034956, Written Opinion mailed Oct. 8, 2024", 8 pgs.
"International Application Serial No. PCT US2024 043636, International Search Report mailed Nov. 27, 2024", 3 pgs.
"International Application Serial No. PCT US2024 043636, Written Opinion mailed Nov. 27, 2024", 4 pgs.
"U.S. Appl. No. 18/355,926, Examiner Interview Summary mailed Nov. 26, 2024", 2 pgs.
"U.S. Appl. No. 17/809,223, Non Final Office Action mailed Dec. 27, 2024", 7 pgs.
"Australian Application Serial No. 2023258379, First Examination Report mailed Jan. 16, 2025", 4 pgs.
"U.S. Appl. No. 18/355,926, Restriction Requirement mailed Dec. 3, 2024", 10 pgs.
"U.S. Appl. No. 18/355,926, Response filed Feb. 3, 2025 to Restriction Requirement mailed Dec. 3, 2024", 8 pgs.
"U.S. Appl. No. 18/355,926, Non Final Office Action mailed Feb. 12, 2025", 10 pgs.
"European Application Serial No. 24174311.1, Response filed Feb. 6, 2025 to Extended European Search Report mailed Jul. 10, 2024", 16 pgs.
"Australian Application Serial No. 2023258379, Response filed Mar. 13, 2025 to First Examination Report mailed Jan. 16, 2025", 3 pgs.
"U.S. Appl. No. 17/809,223, Response filed Mar. 27, 2025 to Non Final Office Action mailed Dec. 27, 2024", 11 pgs.
"U.S. Appl. No. 17/809,223, Notice of Allowance mailed Apr. 25, 2025", 5 pgs.
"U.S. Appl. No. 18/355,926, Response filed May 12, 2025 to Non Final Office Action mailed Feb. 12, 2025", 13 pgs.
"International Application Serial No. PCT US2024 019793, International Preliminary Report on Patentability mailed May 28, 2025", 13 pgs.
"U.S. Appl. No. 18/749,866, Non Final Office Action mailed Jul. 2, 2025", 15 pgs.
"U.S. Appl. No. 18/355,926, Final Office Action mailed Jul. 15, 2025", 11 pgs.
EI Operator, "Direct injection into the nozzle", [Online]. Retrieved from the Internet: https: www.eioperator.com direct-injection-into-the-nozzle , (Accessed online Jul. 30, 2025), 7 pages.
"Agrifac Pulse-width modulation (PWM) spraying", 2021 Agrifac Machinery B.V. [online]. [archived Jan. 16, 2021]. Retrieved from the Internet: <URL: https://web.archive.org/web/20210116150413/https://www.agrifac.com/optional-spray-technology/strictsprayplus/>, (Jan. 16, 2021), 15 pgs.
"U.S. Appl. No. 13/776,285, Amendment and Response under 37 C.F.R. Sec. 1.114 filed Apr. 27, 2015", 13 pgs.
"U.S. Appl. No. 13/776,285, Non Final Office Action mailed Jul. 30, 2014", 15 pgs.
"U.S. Appl. No. 13/776,285, Notice of Allowance mailed Jan. 27, 2015", 5 pgs.
"U.S. Appl. No. 13/776,285, Notice of Allowance mailed May 4, 2015", 6 pgs.
"U.S. Appl. No. 13/776,285, Response filed Dec. 30, 2014 to Non Final Office Action mailed Jul. 30, 2014", 25 pgs.
"U.S. Appl. No. 13/832,678, Advisory Action mailed Jun. 3, 2016", 3 pgs.
"U.S. Appl. No. 13/832,678, Final Office Action mailed Mar. 17, 2016", 12 pgs.
"U.S. Appl. No. 13/832,678, Non Final Office Action mailed Oct. 1, 2015", 15 pgs.
"U.S. Appl. No. 13/832,678, Notice of Allowance mailed Jul. 20, 2016", 13 pgs.
"U.S. Appl. No. 13/832,678, Response filed May 12, 2016 to Final Office Action mailed Mar. 17, 2016", 10 pgs.
"U.S. Appl. No. 13/832,678, Response filed Jul. 27, 2015 to Restriction Requirement mailed Jun. 9, 2015", 7 pgs.
"U.S. Appl. No. 13/832,678, Response filed Dec. 31, 2015 to Non Final Office Action mailed Oct. 1, 2015", 10 pgs.
"U.S. Appl. No. 13/832,678, Restriction Requirement mailed Jun. 9, 2015", 7 pgs.
"U.S. Appl. No. 13/832,735, Final Office Action mailed Aug. 5, 2016", 29 pgs.
"U.S. Appl. No. 13/832,735, Non Final Office Action mailed Feb. 19, 2016", 26 pgs.
"U.S. Appl. No. 13/832,735, Non Final Office Action mailed Jul. 15, 2015", 22 pgs.
"U.S. Appl. No. 13/832,735, Response filed May 19, 2016 to Non Final Office Action mailed Feb. 19, 2016", 13 pgs.
"U.S. Appl. No. 13/832,735, Response filed Nov. 16, 2015 to Non-Final Office Action mailed Jul. 15, 2015", 16 pgs.
"U.S. Appl. No. 14/300,761, Advisory Action mailed Dec. 12, 2017", 3 pgs.
"U.S. Appl. No. 14/300,761, Examiner Interview Summary mailed Nov. 22, 2017", 3 pgs.
"U.S. Appl. No. 14/300,761, Final Office Action mailed Aug. 31, 2017", 11 pgs.
"U.S. Appl. No. 14/300,761, Final Office Action mailed Nov. 27, 2018", 16 pgs.
"U.S. Appl. No. 14/300,761, Final Office Action mailed Dec. 18, 2020", 14 pgs.
"U.S. Appl. No. 14/300,761, Non Final Office Action mailed Feb. 8, 2017", 13 pgs.
"U.S. Appl. No. 14/300,761, Non Final Office Action mailed Apr. 15, 2020", 17 pgs.
"U.S. Appl. No. 14/300,761, Non Final Office Action mailed May 24, 2018", 16 pgs.
"U.S. Appl. No. 14/300,761, Notice of Allowance mailed May 7, 2021", 16 pgs.
"U.S. Appl. No. 14/300,761, Notice of Allowance mailed Sep. 9, 2021", 16 pgs.
"U.S. Appl. No. 14/300,761, Response filed Apr. 19, 2021 to Final Office Action mailed Dec. 18, 2020", 19 pgs.
"U.S. Appl. No. 14/300,761, Response filed Jun. 7, 2017 to Non Final Office Action mailed Feb. 8, 2017", 16 pgs.
"U.S. Appl. No. 14/300,761, Response filed Oct. 15, 2020 to Non Final Office Action mailed Apr. 15, 2020", 17 pgs.
"U.S. Appl. No. 14/300,761, Response filed Oct. 24, 2018 to Non Final Office Action mailed May 24, 2018", 22 pgs.
"U.S. Appl. No. 14/300,761, Response filed Nov. 29, 2019 to Final Office Action mailed Nov. 27, 2018", 21 pgs.
"U.S. Appl. No. 14/300,761, Response filed Dec. 20, 2016 to Restriction Requirement mailed Oct. 20, 2016", 15 pgs.
"U.S. Appl. No. 14/300,761, Resposne filed Nov. 16, 2017 to Final Office Action mailed Aug. 31, 2017", 16 pgs.
"U.S. Appl. No. 14/300,761, Restriction Requirement mailed Oct. 20, 2016", 9 pgs.
"U.S. Appl. No. 14/727,535, Corrected Notice of Allowance mailed Jan. 12, 2018", 2 pgs.
"U.S. Appl. No. 14/727,535, Final Office Action mailed Jun. 21, 2017", 6 pgs.
"U.S. Appl. No. 14/727,535, Non Final Office Action mailed Feb. 16, 2017", 17 pgs.
"U.S. Appl. No. 14/727,535, Notice of Allowance mailed Aug. 24, 2017", 5 pgs.
"U.S. Appl. No. 14/727,535, Preliminary Amendment filed Jun. 2, 2015", 9 pgs.
"U.S. Appl. No. 14/727,535, Response filed Jan. 17, 2017 to Restriction Requirement mailed Nov. 17, 2016", 12 pgs.
"U.S. Appl. No. 14/727,535, Response filed May 6, 2017 to Non Final Office Action mailed Feb. 16, 2017", 18 pgs.

(56) References Cited

OTHER PUBLICATIONS

"U.S. Appl. No. 14/727,535, Response filed Aug. 14, 2017 to Final Office Action mailed Jun. 21, 2017", 9 pgs.
"U.S. Appl. No. 14/727,535, Restriction Requirement mailed Nov. 17, 2016", 6 pgs.
"U.S. Appl. No. 14/899,946, Final Office Action mailed Dec. 28, 2018", 41 pgs.
"U.S. Appl. No. 14/899,946, Non Final Office Action mailed Mar. 26, 2018", 37 pgs.
"U.S. Appl. No. 14/899,946, Response filed Aug. 27, 2018 to Non Final Office Action malled Mar. 26, 2018", 27 pgs.
"U.S. Appl. No. 15/029,935, Final Office Action mailed Jul. 11, 2017", 6 pgs.
"U.S. Appl. No. 15/029,935, Non Final Office Action mailed Mar. 30, 2017", 21 pgs.
"U.S. Appl. No. 15/029,935, Notice of Allowance mailed Aug. 29, 2017", 5 pgs.
"U.S. Appl. No. 15/029,935, Preliminary Amendment filed Apr. 15, 2016", 3 pgs.
"U.S. Appl. No. 15/029,935, Reponse filed Aug. 16, 2017 to Final Office Action mailed Jul. 11, 2017", 11 pgs.
"U.S. Appl. No. 15/029,935, Response filed Jun. 15, 2017 to Non Final Office Action mailed Mar. 30, 2017", 12 pgs.
"U.S. Appl. No. 15/585,034, Non Final Office Action mailed Nov. 2, 2018", 25 pgs.
"U.S. Appl. No. 15/629,696, Corrected Notice of Allowability mailed Aug. 29, 2018", 4 pgs.
"U.S. Appl. No. 15/629,696, Corrected Notice of Allowability mailed Dec. 7, 2018", 2 pgs.
"U.S. Appl. No. 15/629,696, Ex Parte Quayle Action mailed May 3, 2018", 12 pgs.
"U.S. Appl. No. 15/629,696, Response filed Jul. 3, 2018 to Ex Parte Quayle Action mailed May 3, 2018", 13 pgs.
"U.S. Appl. No. 15/629,696, Response filed Nov. 13, 2018 to Examiner's Reasons for Allowance mailed May 3, 2018", 2 pgs.
"U.S. Appl. No. 15/703,818, Corrected Notice of Allowability mailed Jul. 8, 2019", 2 pgs.
"U.S. Appl. No. 15/703,818, Non Final Office Action mailed Oct. 11, 2018", 6 pgs.
"U.S. Appl. No. 15/703,818, Notice of Allowance mailed Mar. 20, 2019", 5 pgs.
"U.S. Appl. No. 15/703,818, Preliminary Amendment filed Nov. 3, 2017", 6 pgs.
"U.S. Appl. No. 15/703,8181, Response filed Jan. 11, 2019 to Non Final Office Action mailed Oct. 11, 2018", 9 pgs.
"U.S. Appl. No. 15/821,113, Corrected Notice of Allowability mailed Jan. 2, 2020", 2 pgs.
"U.S. Appl. No. 15/821,113, Corrected Notice of Allowability mailed Jan. 28, 2020", 2 pgs.
"U.S. Appl. No. 15/821,113, Ex Parte Quayle Action mailed Aug. 9, 2019", 4 pgs.
"U.S. Appl. No. 15/821,113, Notice of Allowance mailed Sep. 27, 2019", 5 pgs.
"U.S. Appl. No. 15/821,113, Notice of Allowance mailed Oct. 22, 2019", 5 pgs.
"U.S. Appl. No. 15/821,113, Notice of Non-Compliant Amendment mailed Jun. 11, 2019", 4 pgs.
"U.S. Appl. No. 15/821,113, Preliminary Amendment filed Jun. 28, 2018", 7 pgs.
"U.S. Appl. No. 15/821,113, Response filed Apr. 29, 2019 to Restriction Requirement mailed Nov. 30, 2018", 10 pgs.
"U.S. Appl. No. 15/821,113, Response filed Jul. 11, 2019 to Notice of Non-Compliant Amendment mailed Jun. 11, 2019", 12 pgs.
"U.S. Appl. No. 15/821,113, Response filed Sep. 9, 2019 to Ex Parte Quayle Action mailed Aug. 9, 2019", 3 pgs.
"U.S. Appl. No. 15/821,113, Restriction Requirement mailed Nov. 30, 2018", 6 pgs.
"U.S. Appl. No. 16/447,779, Corrected Notice of Allowability mailed May 26, 2021", 2 pgs.
"U.S. Appl. No. 16/447,779, Corrected Notice of Allowability mailed Sep. 9, 2021", 2 pgs.
"U.S. Appl. No. 16/447,779, Non Final Office Action mailed Jan. 12, 2021", 9 pgs.
"U.S. Appl. No. 16/447,779, Notice of Allowance mailed May 20, 2021", 5 pgs.
"U.S. Appl. No. 16/447,779, Preliminary Amendment filed Dec. 30, 2019", 4 pgs.
"U.S. Appl. No. 16/447,779, Response filed Apr. 12, 2021 to Non Final Office Action mailed Jan. 12, 2021", 7 pgs.
"U.S. Appl. No. 16/476,016, Advisory Action mailed Nov. 3, 2023", 3 pgs.
"U.S. Appl. No. 16/476,016, Corrected Notice of Allowability mailed Feb. 22, 2024", 3 pgs.
"U.S. Appl. No. 16/476,016, Corrected Notice of Allowability mailed Mar. 13, 2024", 2 pgs.
"U.S. Appl. No. 16/476,016, Corrected Notice of Allowability mailed Apr. 16, 2024", 2 pgs.
"U.S. Appl. No. 16/476,016, Decision on Pre-Appeal Brief Request mailed Dec. 18, 2023", 2 pgs.
"U.S. Appl. No. 16/476,016, Examiner Interview Summary mailed Jan. 16, 2024", 2 pgs.
"U.S. Appl. No. 16/476,016, Examiner Interview Summary mailed Jan. 27, 2023", 2 pgs.
"U.S. Appl. No. 16/476,016, Examiner Interview Summary mailed Apr. 15, 2022", 2 pgs.
"U.S. Appl. No. 16/476,016, Examiner Interview Summary mailed Jun. 29, 2023", 2 pgs.
"U.S. Appl. No. 16/476,016, Examiner Interview Summary mailed Oct. 4, 2022", 2 pgs.
"U.S. Appl. No. 16/476,016, Final Office Action mailed Jan. 11, 2022", 15 pgs.
"U.S. Appl. No. 16/476,016, Final Office Action mailed Jul. 20, 2023", 21 pgs.
"U.S. Appl. No. 16/476,016, Final Office Action mailed Nov. 15, 2022", 20 pgs.
"U.S. Appl. No. 16/476,016, Non Final Office Action mailed Mar. 28, 2023", 22 pgs.
"U.S. Appl. No. 16/476,016, Non Final Office Action mailed Jun. 24, 2022", 15 pgs.
"U.S. Appl. No. 16/476,016, Non Final Office Action mailed Aug. 31, 2021", 14 pgs.
"U.S. Appl. No. 16/476,016, Notice of Allowability mailed May 21, 2024", 3 pgs.
"U.S. Appl. No. 16/476,016, Notice of Allowance mailed Feb. 14, 2024", 8 pgs.
"U.S. Appl. No. 16/476,016, Pre-Appeal Brief Request filed Nov. 20, 2023", 5 pgs.
"U.S. Appl. No. 16/476,016, Preliminary Amendment filed Jul. 3, 2019", 12 pgs.
"U.S. Appl. No. 16/476,016, Response filed Feb. 15, 2023 to Final Office Action mailed Nov. 15, 2022", 24 pgs.
"U.S. Appl. No. 16/476,016, Response filed Apr. 11, 2022 to Final Office Action mailed Jan. 11, 2022", 18 pgs.
"U.S. Appl. No. 16/476,016, Response filed Jun. 28, 2023 to Non Final Office Action mailed Mar. 28, 2023", 23 pgs.
"U.S. Appl. No. 16/476,016, Response filed Jul. 28, 2021 to Restriction Requirement mailed Apr. 30, 2021", 12 pgs.
"U.S. Appl. No. 16/476,016, Response filed Oct. 24, 2022 to Non Final Office Action mailed Jun. 24, 2022", 22 pgs.
"U.S. Appl. No. 16/476,016, Response filed Oct. 24, 2023 to Final Office Action mailed Jul. 20, 2023", 21 pgs.
"U.S. Appl. No. 16/476,016, Response filed Nov. 29, 2021 to Non Final Office Action mailed Aug. 31, 2021", 19 pgs.
"U.S. Appl. No. 16/476,016, Restriction Requirement mailed Apr. 30, 2021", 8 pgs.
"U.S. Appl. No. 16/476,069, Corrected Notice of Allowability mailed Jan. 30, 2023", 2 pgs.
"U.S. Appl. No. 16/476,069, Examiner Interview Summary mailed Mar. 18, 2022", 2 pgs.
"U.S. Appl. No. 16/476,069, Examiner Interview Summary mailed U.S. Appl. No. 16/476,069, Examiner Interview Summary mailed Oct. 28, 2022", 2 pgs.

(56) References Cited

OTHER PUBLICATIONS

"U.S. Appl. No. 16/476,069, Final Office Action mailed Jul. 25, 2022", 13 pgs.
"U.S. Appl. No. 16/476,069, Non Final Office Action mailed Nov. 12, 2021", 13 pgs.
"U.S. Appl. No. 16/476,069, Notice of Allowance mailed Jan. 19, 2023", 8 pgs.
"U.S. Appl. No. 16/476,069, Notice of Allowance mailed Apr. 20, 2023", 8 pgs.
"U.S. Appl. No. 16/476,069, Preliminary Amendment filed Jul. 3, 2019", 13 pgs.
"U.S. Appl. No. 16/476,069, Response filed Apr. 11, 2022 to Non Final Office Action mailed Nov. 12, 2021", 12 pgs.
"U.S. Appl. No. 16/476,069, Response filed Jul. 27, 2021 to Restriction Requirement mailed May 3, 2021", 10 pgs.
"U.S. Appl. No. 16/476,069, Response filed Oct. 25, 2022 to Final Office Action mailed Jul. 25, 2022", 13 pgs.
"U.S. Appl. No. 16/476,069, Restriction Requirement mailed May 3, 2021", 9 pgs.
"U.S. Appl. No. 16/731,325, Corrected Notice of Allowability mailed Jun. 15, 2021", 2 pgs.
"U.S. Appl. No. 16/731,325, Ex Parte Quayle Action mailed Oct. 22, 2020", 5 pgs.
"U.S. Appl. No. 16/731,325, Examiner Interview Summary mailed Oct. 23, 2020", 2 pgs.
"U.S. Appl. No. 16/731,325, Notice of Allowance mailed Feb. 18, 2021", 8 pgs.
"U.S. Appl. No. 16/731,325, Notice of Allowance mailed Mar. 23, 2021", 5 pgs.
"U.S. Appl. No. 16/731,325, Notice of Allowance mailed Dec. 7, 2020", 5 pgs.
"U.S. Appl. No. 16/731,325, Preliminary Amendment filed Mar. 24, 2020", 8 pgs.
"U.S. Appl. No. 16/731,325, Response filed Nov. 20, 2020 to Ex Parte Quayle Action mailed Oct. 22, 2020", 10 pgs.
"U.S. Appl. No. 17/001,539, 312 Amendment filed Oct. 5, 2021", 3 pgs.
"U.S. Appl. No. 17/001,539, Notice of Allowance mailed Jun. 3, 2021", 12 pgs.
"U.S. Appl. No. 17/001,539, Notice of Allowance mailed Sep. 15, 2021", 11 pgs.
"U.S. Appl. No. 17/001,539, Supplemental Notice of Allowability mailed Dec. 23, 2021", 4 pgs.
"U.S. Appl. No. 17/161,453, Final Office Action mailed Sep. 7, 2023", 7 pgs.
"U.S. Appl. No. 17/161,453, Non Final Office Action mailed Mar. 15, 2023", 17 pgs.
"U.S. Appl. No. 17/161,453, Notice of Allowance mailed Nov. 22, 2023", 5 pgs.
"U.S. Appl. No. 17/161,453, Preliminary Amendment filed Jan. 28, 2021", 8 pgs.
"U.S. Appl. No. 17/161,453, Response filed Jun. 15, 2023 to Non Final Office Action mailed Mar. 15, 2023", 15 pgs.
"U.S. Appl. No. 17/161,453, Response filed Nov. 7, 2023 to Final Office Action mailed Sep. 7, 2023", 8 pgs.
"U.S. Appl. No. 17/224,955, Final Office Action mailed Aug. 15, 2022", 6 pgs.
"U.S. Appl. No. 17/224,955, Non Final Office Action mailed Mar. 7, 2022", 7 pgs.
"U.S. Appl. No. 17/224,955, Notice of Allowance mailed Oct. 27, 2022", 5 pgs.
"U.S. Appl. No. 17/224,955, Response filed Aug. 3, 2022 to Non Final Office Action mailed Mar. 7, 2022", 12 pgs.
"U.S. Appl. No. 17/224,955, Supplemental Notice of Allowability mailed Feb. 22, 2023", 2 pgs.
"U.S. Appl. No. 17/224,955, Supplemental Notice of Allowability mailed Mar. 1, 2023", 2 pgs.
"U.S. Appl. No. 17/410,852, Final Office Action mailed Nov. 14, 2023", 8 pgs.
"U.S. Appl. No. 17/410,852, Non Final Office Action mailed Aug. 1, 2023", 9 pgs.
"U.S. Appl. No. 17/410,852, Preliminary Amendment filed Dec. 10, 2021", 8 pgs.
"U.S. Appl. No. 17/410,852, Response filed Feb. 14, 2024 to Final Office Action mailed Nov. 14, 2023", 10 pgs.
"U.S. Appl. No. 17/410,852, Response filed Nov. 1, 2023 to Non Final Office Action mailed Aug. 1, 2023", 15 pgs.
"U.S. Appl. No. 17/465,644, Preliminary Amendment filed Dec. 17, 2021", 11 pgs.
"U.S. Appl. No. 17/465,644, Response filed Dec. 13, 2023 to Restriction Requirement mailed Oct. 13, 2023", 11 pgs.
"U.S. Appl. No. 17/465,644, Restriction Requirement mailed Oct. 13, 2023", 6 pgs.
"U.S. Appl. No. 17/504,601, Preliminary Amendment filed Dec. 22, 2021", 7 pgs.
"U.S. Appl. No. 17/809,223, Final Office Action mailed Jun. 13, 2024", 19 pgs.
"U.S. Appl. No. 17/809,223, Final Office Action mailed Jul. 19, 2023", 17 pgs.
"U.S. Appl. No. 17/809,223, Non Final Office Action mailed Jan. 19, 2024", 17 pgs.
"U.S. Appl. No. 17/809,223, Non Final Office Action mailed Feb. 15, 2023", 15 pgs.
"U.S. Appl. No. 17/809,223, Preliminary Amendment filed Nov. 3, 2022", 7 pgs.
"U.S. Appl. No. 17/809,223, Response filed Apr. 19, 2024 to Non Final Office Action mailed Jan. 19, 2024", 19 pgs.
"U.S. Appl. No. 17/809,223, Response filed Jun. 14, 2023 to Non Final Office Action mailed Feb. 15, 2023", 17 pgs.
"U.S. Appl. No. 17/809,223, Response filed Dec. 19, 2023 to Final Office Action mailed Jul. 19, 2023", 14 pgs.
"U.S. Appl. No. 18/140,491, Preliminary Amendment Filed May 3, 2023", 15 pgs.
"U.S. Appl. No. 18/355,926, Preliminary Amendment", 6 pgs.
"U.S. Appl. No. 18/355,926, Preliminary Amendment filed Jan. 10, 2024", 6 pgs.
"U.S. Appl. No. 18/575,725, Supplemental Preliminary Amendment filed Jan. 16, 2024", 11 pgs.
"Application Serial No. PCT/US2014/061150, International Preliminary Report on Patentability mailed Oct. 16, 2015", 10 pgs.
"U.S. Appl. No. 15/629,696, Notice of Allowance mailed Aug. 13, 2018", 5 pgs.
"Australian Application Serial No. 2013277513, First Examiners Report mailed Jul. 26, 2016", 3 pgs.
"Australian Application Serial No. 2013277513, Notice of Acceptance mailed Nov. 8, 2016", 2 pgs.
"Australian Application Serial No. 2013277513, Response filed Oct. 28, 2016 to First Examiners Report mailed Jul. 26, 2016", 20 pgs.
"Australian Application Serial No. 2014278310, First Examiners Report mailed on Jul. 28, 2017", 5 pgs.
"Australian Application Serial No. 2017285727, First Examination Report mailed May 21, 2019", 2 pgs.
"Australian Application Serial No. 2017285727, Response filed Mar. 23, 2020 to First Examination Report mailed May 21, 2019", 10 pgs.
"Australian Application Serial No. 2018205225, First Examination Report mailed Apr. 15, 2020", 18 pgs.
"Australian Application Serial No. 2018205225, Response filed Jan. 19, 2021 to First Examination Report mailed Apr. 15, 2020", 14 pgs.
"Australian Application Serial No. 2018205225, Response filed Apr. 13, 2021 to Subsequent Examiners Report mailed Feb. 11, 2021", 24 pgs.
"Australian Application Serial No. 2018205225, Subsequent Examiners Report mailed Feb. 11, 2021", 6 pgs.
"Australian Application Serial No. 2020357581, First Examination Report mailed Feb. 2, 2023" 2 pgs.
"Australian Application Serial No. 2021209314, First Examination Report mailed Jan. 9, 2023", 5 pgs.
"Australian Application Serial No. 2021209314, Response filed Jul. 6, 2023 to First Examination Report mailed Jan. 9, 2023", 10 pgs.

(56) References Cited

OTHER PUBLICATIONS

"Australian Application Serial No. 2021297320, First Examination Report mailed Nov. 7, 2023" 2 pgs.
"Brazilian Application Serial No. 1120160085175, Office Action mailed Jan. 18, 2022", (w/ Concise Statement of Relevance), 26 pgs.
"Brazilian Application Serial No. 1120160085175, Office Action mailed Mar. 25, 2020", (w/ English Translation), 6 pgs.
"Brazilian Application Serial No. 1120160085175, Office Action mailed Nov. 6, 2018", (w/ English Translation), 6 pgs.
"Brazilian Application Serial No. 1120160085175, Office Action mailed Dec. 4, 2023", w/ Machine English translation, 9 pgs.
"Brazilian Application Serial No. 1120160085175, Response filed Jul. 27, 2020 to Office Action mailed Mar. 25, 2020", (w/ English Translation of Claims), 102 pgs.
"Brazilian Application Serial No. 1120180747017, Office Action mailed Jul. 22, 2021", (w/ English Translation), 5 pgs.
"Brazilian Application Serial No. 1120180747017, Office Action mailed Sep. 6, 2022", W/ English Translation, 6 pgs.
"Brazilian Application Serial No. 1120180747017, Opinion for non-patenteability (RPI 7.1) mailed Mar. 29, 2022", (w/ English Translation), 18 pgs.
"Brazilian Application Serial No. 1120180747017, Response filed Jul. 4, 2022 Opinion for non-patentability (RPI 7.1) mailed Mar. 29, 2022", (w/ Concise Statement of Relevance), 22 pgs.
"Brazilian Application Serial No. 1120180747017, Response filed Oct. 20, 2021 to Office Action mailed Jul. 22, 2021", (w/ English Translation of Claims), 14 pgs.
"Brazilian Application Serial No. 1120180747017, Response filed Dec. 5, 2022 to Office Action mailed Sep. 6, 2022", w/ English Translation, 2 pgs.
"Brazilian Application Serial No. 1120180747017, Voluntary Amendment filed Jun. 22, 2020", (w/ English Translation), 44 pgs.
"Canadian Application Serial No. 2,877,195, Examiner's Rule 86(2) Report filed Nov. 21, 2022", 3 pgs.
"Canadian Application Serial No. 2,877,195, Office Action mailed Jun. 5, 2023", 3 pgs.
"Canadian Application Serial No. 2,877,195, Office Action mailed Jun. 18, 2019", 3 pgs.
"Canadian Application Serial No. 2,877,195, Office Action mailed Dec. 9, 2020", 3 pgs.
"Canadian Application Serial No. 2,877,195, Response filed Mar. 20, 2023 to Examiner's Rule 86(2) Report filed Nov. 21, 2022", 7 pgs.
"Canadian Application Serial No. 2,877,195, Response filed Apr. 8, 2021 to Office Action mailed Dec. 9, 20", 16 pgs.
"Canadian Application Serial No. 2,877,195, Response filed Oct. 4, 2023 to Office Action mailed Jun. 5, 2023", 7 pgs.
"Canadian Application Serial No. 2,877,195, Response filed Dec. 18, 2019 to Office Action mailed Jun. 18, 2019", 10 pgs.
"Canadian Application Serial No. 2,877,195, Voluntary Amendment filed Nov. 16, 2020", 13 pgs.
"Canadian Application Serial No. 2,926,448, Examiner's Rule 30(2) Requisition mailed Jul. 23, 2019", 3 pgs.
"Canadian Application Serial No. 2,926,448, Examiner's Rule 30(2) Requisition mailed Oct. 3, 2018", 3 pgs.
"Canadian Application Serial No. 2,926,448, Office Action mailed Jan. 5, 2018", 5 pgs.
"Canadian Application Serial No. 2,926,448, Response filed Mar. 19, 2019 to Examiner's Rule 30(2) Requisition mailed Oct. 3, 2018", 7 pgs.
"Canadian Application Serial No. 2,926,448, Response filed Jun. 26, 2018 to Office Action mailed Jan. 5, 2018", 19 pgs.
"Canadian Application Serial No. 2,926,448, Response filed Dec. 11, 2019 to Examiner's Rule 30(2) Requisition mailed Jul. 23, 2019", 4 pgs.
"Canadian Application Serial No. 3,013,670, Examiner's Rule 30(2) Requisition mailed Sep. 11, 2019", 5 pgs.
"Canadian Application Serial No. 3,013,670, Response filed Mar. 11, 2020 to Examiner's Rule 30(2) Requisition mailed Sep. 11, 2019", 68 pgs.
"Canadian Application Serial No. 3,049,391, Examiners Rule 86(2) Report mailed Jul. 6, 2023", 5 pgs.
"Canadian Application Serial No. 3,049,391, Office Action mailed Sep. 4, 2020", 4 pgs.
"Canadian Application Serial No. 3,049,391, Office Action mailed Sep. 26, 2022", 4 pgs.
"Canadian Application Serial No. 3,049,391, Office Action mailed Dec. 1, 2021", 4 pgs.
"Canadian Application Serial No. 3,049,391, Response filed Jan. 20, 2023 to Office Action mailed Sep. 26, 2022", 7 pgs.
"Canadian Application Serial No. 3,049,391, Response filed Mar. 3, 2021 to Office Action mailed Sep. 4, 2020", 11 pgs.
"Canadian Application Serial No. 3,049,391, Response filed Mar. 15, 2022 to Office Action mailed Dec. 1, 2021", 8 pgs.
"Canadian Application Serial No. 3,049,391, Response filed Nov. 2, 2023 to Examiners Rule 86(2) Report mailed Jul. 6, 2023", 7 pgs.
"Canadian Application Serial No. 3,049,421, Office Action mailed Jun. 4, 2021", 3 pgs.
"Canadian Application Serial No. 3,049,421, Office Action mailed Nov. 5, 2020", 3 pgs.
"Canadian Application Serial No. 3,049,421, Office Action mailed Nov. 29, 2021", 4 pgs.
"Canadian Application Serial No. 3,049,421, Response filed Mar. 1, 2021 to Office Action mailed Nov. 5, 2020", 19 pgs.
"Canadian Application Serial No. 3,049,421, Response filed Mar. 25, 2022 to Office Action mailed Nov. 29, 2021", 18 pgs.
"Canadian Application Serial No. 3,049,421, Response filed Oct. 1, 2021 to Office Action mailed Jun. 4, 2021", 33 pgs.
"Canadian Application Serial No. 3,185,961, Examiners Rule 86(2) Report mailed May 6, 2024", 3 pgs.
"Canadian Application Serial No. 3153465, Examiners Rule 86(2) Report mailed Jan. 13, 2023", 3 pgs.
"Canadian Application Serial No. 3153465, Response filed May 1, 2023 to Examiners Rule 86(2) Report mailed Jan. 13, 2023", 2 pgs.
"Electrostatic Dispersal Solutions", https://web.archive.org/web/20170928035648/https://www.4rysprays.com/, (Captured on Sep. 28, 2017), 6 pgs.
"European Application Serial No. 13807150.1, Communication Pursuant to Article 94(3) EPC mailed Nov. 8, 2017", 5 pgs.
"European Application Serial No. 13807150.1, Extended European Search Report mailed Jan. 8, 2016", 8 pgs.
"European Application Serial No. 13807150.1, Office Action mailed Jan. 26, 2016", 1 pg.
"European Application Serial No. 13807150.1, Office Action mailed Feb. 3, 2015", 3 pgs.
"European Application Serial No. 13807150.1, Response filed Aug. 3, 2015 to Office Action mailed Feb. 3, 2015", 10 pgs.
"European Application Serial No. 13807150.1, Response filed Aug. 5, 2016 to Office Action mailed Jan. 26, 2016", 14 pgs.
"European Application Serial No. EPC mailed Apr. 3, 2023", 4 pgs.
"European Application Serial No. EPC mailed Jun. 10, 2022", 3 pgs.
"European Application Serial No. EPC mailed Jun. 18, 2021", 4 pgs.
"European Application Serial No. 18735853.6, Extended European Search Report mailed Jun. 16, 2020", 8 pgs.
"European Application Serial No. 18735853.6, Response filed Jan. 11, 2021 to Extended European Search Report mailed Jun. 16, 2020", 16 pgs.
"European Application Serial No. 18735853.6, Response filed Feb. 24, 2020 to Communication pursuant to Rules 161(2) and 162 EPC mailed Aug. 13, 2019", 16 pgs.
"European Application Serial No. 18735853.6, Response filed Sep. 12, 2023 to Communication Pursuant to Article 94(3) EPC mailed Apr. 3, 2023", 9 pgs.
"European Application Serial No. 18735853.6, Response filed Oct. 18, 2022 to Communication Pursuant to Article 94(3) EPC mailed Jun. 10, 2022", 24 pgs.

(56) References Cited

OTHER PUBLICATIONS

"European Application Serial No. 18735853.6, Response filed Oct. 28, 2021 to Communication Pursuant to Article 94(3) EPC mailed Jun. 18, 2021", 17 pgs.
"European Application Serial No. 18736496.3, Communication Pursuant to Article 94(3) EPC mailed Mar. 24, 2023", 10 pgs.
"European Application Serial No. 18736496.3, Communication Pursuant to Article 94(3) EPC mailed Dec. 12, 2023", 13 pgs.
"European Application Serial No. 18736496.3, Extended European Search Report mailed Sep. 15, 2020", 9 pgs.
"European Application Serial No. 18736496.3, Response filed Apr. 12, 2021 to Extended European Search Report mailed Sep. 15, 2020", 31 pgs.
"European Application Serial No. 18736496.3, Response filed Jun. 10, 2024 to Communication Pursuant to Article 94(3) EPC mailed Dec. 12, 2023", 13 pgs.
"European Application Serial No. 18736496.3, Response filed Aug. 3, 2023 to Communication Pursuant to Article 94(3) EPC mailed Mar. 24, 2023", 10 pgs.
"European Application Serial No. 18736496.3, Response to Communication Pursuant to Rules 161(2) and 162 EPC filed Feb. 28, 2020", 14 pgs.
"European Application Serial No. 20872967.3, Extended European Search Report mailed Sep. 29, 2023", 9 pgs.
"European Application Serial No. 20872967.3, Response to Communication Pursuant to Rules 161 and 162 EPC filed Nov. 17, 2022", 9 pgs.
"European Application Serial No. 21827830.7, Voluntary Amendment filed Aug. 9, 2023", 6 pgs.
"German Application Serial No. 11 2017 003 084.6, Office Action mailed Feb. 5, 2019", (w/ English Translation), 5 pgs.
"German Application Serial No. 11 2017 003 084.6, Response filed May 8, 2019 to Office Action mailed Feb. 5, 2019", (w/ Concise Statement of Relevance), 17 pgs.
"International Application Serial No. PCT/US2013/045445, International Preliminary Report on Patentability mailed Dec. 31, 2014", 7 pgs.
"International Application Serial No. PCT/US2013/045445, International Search Report mailed Nov. 27, 2013", 3 pgs.
"International Application Serial No. PCT/US2013/045445, Written Opinion mailed Nov. 27, 2013", 9 pgs.
"International Application Serial No. PCT/US2014/041717, International Preliminary Report on Patentability mailed May 6, 2015", 11 pgs.
"International Application Serial No. PCT/US2014/041717, International Search Report mailed Oct. 15, 2014", 2 pgs.
"International Application Serial No. PCT/US2014/041717, Response and Amendment filed Apr. 5, 2015 to Written Opinion mailed Oct. 15, 2014", 15 pgs.
"International Application Serial No. PCT/US2014/041717, Written Opinion mailed Oct. 15, 2014", 7 pgs.
"International Application Serial No. PCT/US2014/043926, International Preliminary Report on Patentability Jan. 7, 2016", 11 pgs.
"International Application Serial No. PCT/US2014/043926, International Search Report mailed Nov. 3, 2014", 2 pgs.
"International Application Serial No. PCT/US2014/043926, Written Opinion mailed Nov. 3 2014", 9 pgs.
"International Application Serial No. PCT/US2014/061150, International Search Report mailed Feb. 4, 2015", 2 pgs.
"International Application Serial No. PCT/US2014/061150, Written Opinion mailed Feb. 4, 2015", 7 pgs.
"International Application Serial No. PCT/US2017/030694, International Preliminary Report on Patentability mailed May 29, 2018", 23 pgs.
"International Application Serial No. PCT/US2017/030694, International Search Report mailed Aug. 1, 2017", 3 pgs.
"International Application Serial No. PCT/US2017/030694, Response filed Mar. 2, 2018 to Written Opinion mailed Aug. 1, 2017", 4 pgs.
"International Application Serial No. PCT/US2017/030694, Written Opinion mailed Aug. 1, 2017", 8 pgs.
"International Application Serial No. PCT/US2017/038622, International Preliminary Report on Patentability mailed Jan. 3, 2019", 7 pgs.
"International Application Serial No. PCT/US2017/038622, International Search Report mailed Sep. 28, 2017", 2 pgs.
"International Application Serial No. PCT/US2017/038622, Written Opinion mailed Sep. 28, 2017", 5 pgs.
"International Application Serial No. PCT/US2018/012590, International Preliminary Report on Patentability mailed Jul. 18, 2019", 15 pgs.
"International Application Serial No. PCT/US2018/012590, International Search Report mailed Apr. 13, 2018", 4 pgs.
"International Application Serial No. PCT/US2018/012590, Invitation to Pay Additional Fees and Partial Search Report mailed Feb. 21, 2018", 2 pgs.
"International Application Serial No. PCT/US2018/012590, Written Opinion mailed Apr. 13, 2018", 13 pgs.
"International Application Serial No. PCT/US2018/012661, International Preliminary Report on Patentability mailed Jul. 18, 2019", 11 pgs.
"International Application Serial No. PCT/US2018/012661, International Search Report mailed Jun. 21, 2018", 4 pgs.
"International Application Serial No. PCT/US2018/012661, Invitation to Pay Additional Fees and Partial Search Report mailed Mar. 15, 2018", 2 pgs.
"International Application Serial No. PCT/US2018/012661, Written Opinion mailed Jun. 21, 2018", 9 pgs.
"International Application Serial No. PCT/US2020/047696, International Preliminary Report on Patentability mailed Apr. 14, 2022", 6 pgs.
"International Application Serial No. PCT/US2020/047696, International Search Report mailed Nov. 23, 2020", 2 pgs.
"International Application Serial No. PCT/US2020/047696, Written Opinion mailed Nov. 23, 2020", 4 pgs.
"International Application Serial No. PCT/US2021/026252, International Search Report mailed Jun. 15, 2021", 2 pgs.
"International Application Serial No. PCT/US2021/026252, Written Opinion mailed Jun. 15, 2021", 4 pgs.
"International Application Serial No. PCT/US2021/038955, International Preliminary Report on Patentability mailed Jan. 5, 2023", 7 pgs.
"International Application Serial No. PCT/US2021/038955, International Search Report mailed Sep. 29, 2021", 2 pgs.
"International Application Serial No. PCT/US2021/038955, Written Opinion mailed Sep. 29, 2021", 5 pgs.
"International Application Serial No. PCT/US2022/027707, International Preliminary Report on Patentability mailed Jan. 11, 2024", 11 pgs.
"International Application Serial No. PCT/US2022/027707, International Search Report mailed Aug. 17, 2022", 5 pgs.
"International Application Serial No. PCT/US2022/027707, Written Opinion mailed Aug. 17, 2022", 9 pgs.
"International Application Serial No. PCT/US2022/048981, International Search Report mailed Apr. 13, 2023", 6 pgs.
"International Application Serial No. PCT/US2022/048981, Invitation to Pay Additional Fees mailed Jan. 19, 2023", 5 pgs.
"International Application Serial No. PCT/US2022/048981, Written Opinion mailed Apr. 13, 2023", 18 pgs.
"International Application Serial No. PCT/US2024/019793, International Search Report mailed Jun. 27, 2024", 5 pgs.
"International Application Serial No. PCT/US2024/019793, Written Opinion mailed Jun. 27, 2024", 10 pgs.
"Wilger 2019-20 Manufacturer's Suggested Retail Price List", (Revised Sep. 1, 2019), 20 pgs.
Bevly, David M, et al., "Carrier-Phase Differential GPS for Control of a Tractor Towed Implement", Proceedings of the 13th International Technical Meeting of the Satellite Division of The Institute of Navigation (ION GPS 2000), (2000), 2263-2268.
Dietz, John, "A five-part program for efficient farming", Farming, (Apr. 2000), 1-4.
Elmore, Clyde L., "Soil Solarization A Nonpesticidal Method for Controlling Diseases, Nematodes, and Weeds", University of California Division of Agriculture and Natural Resources Publication 21377, (1997), 1-17.

(56) References Cited

OTHER PUBLICATIONS

Madsen, Jesper, et al., "Measurement of droplet size and velocity distributions in sprays using Interferometric Particle Imaging (IPI) and Particle Tracking Velocimetry (PTV)", Proceedings 9th International Conference on Liquid Atomization and Spray Systems—ICLASS 2003, (Jan. 2003), 9 pgs.
Van Zuydam, R. P, "A driver's steering ald for an agricultural implement, based on an electronic map and Real Time Kinematic DGPS", Computers and Electronics in Agriculture, 24(3), (Dec. 1999), 153-163.
Van Zuydam, R. P, "Centimeter-Precision Guidance of Agricultural Implements in the Open Field by Means of Real Time Kinematic Dgps", Proceedings of the Fourth International Conference on Precision Agriculture, (1999), 1023-1034.
"U.S. Appl. No. 18/355,926, Notice of Allowance mailed Jan. 30, 2026", 8 pgs.
"U.S. Appl. No. 18/355,926, Response filed Dec. 10, 2025 to Final Office Action mailed Jul. 15, 2025", 11 pgs.
"U.S. Appl. No. 18/749,866, Final Office Action mailed Dec. 17, 2025", 13 pgs.
"U.S. Appl. No. 18/749,866, Response filed Dec. 1, 2025 to Non Final Office Action mailed Jul. 2, 2025", 18 pgs.
"U.S. Appl. No. 19/279,385, Preliminary Amendment filed Nov. 24, 2025", 6 pgs.
"European Application Serial No. 24174311.1, Communication Pursuant to Article 94(3) EPC mailed Oct. 9, 2025", 4 pgs.
"International Application Serial No. PCT/US2024/034956, International Preliminary Report on Patentability mailed Jan. 2, 2026", 10 pgs.
"Australian Application Serial No. 2024236520, First Examination Report mailed Apr. 24, 2026", 3 pages.
"U.S. Appl. No. 18/355,926, Corrected Notice of Allowability mailed Feb. 12, 2026", 2 pgs.
"International Application Serial No. PCT US2024 043636, International Preliminary Report on Patentability mailed Mar. 12, 2026", 6 pgs.
"U.S. Appl. No. 18/749,866, Examiner Interview Summary mailed Mar. 26, 2026", 2 pgs.
"U.S. Appl. No. 18/813,786, Notice of Allowance mailed Apr. 16, 2026", 12 pgs.
"U.S. Appl. No. 18/749,866, Response filed Apr. 17, 2026 to Final Office Action mailed Dec. 17, 2025", 19 pgs.
"U.S. Appl. No. 18/355,926, Corrected Notice of Allowability mailed May 4, 2026", 2 pgs.
"U.S. Appl. No. 18/749,866, Notice of Allowance mailed May 27, 2026", 8 pages.
"European Application Serial No. 24174311.1, Communication Pursuant to Article 943 EPC mailed Jun. 1, 2026", 5 pages.
"Australian Application Serial No. 2024236520, Response filed Jun. 1, 2026 to First Examination Report mailed Apr. 24, 2026", 100 pages.

* cited by examiner

MODULATING NOZZLE ASSEMBLY AND METHODS FOR SAME

CROSS-REFERENCE TO RELATED APPLICATIONS

This application claims the benefit of U.S. Provisional Application No. 63/489,892, filed Mar. 13, 2023, which is incorporated by reference as if fully set forth herein.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright Raven Industries, Inc. of Sioux Falls, South Dakota. All Rights Reserved.

TECHNICAL FIELD

This document pertains generally, but not by way of limitation, to the sprayed application of agricultural products (fluid or gaseous).

BACKGROUND

Agricultural sprayers are used to distribute agricultural products, such as fertilizers, insecticides, herbicides and fungicides to crops. Agricultural sprayers include one or more sprayer booms that are long enough (e.g., 60 feet to 150 feet) to spray multiple rows of crops in a single pass. Each of the sprayer booms include multiple sprayer nozzles to distribute an agricultural product in a spray pattern.

Agricultural sprayers include a reservoir for a carrier fluid. The carrier fluid is used as a vehicle to carry and distribute one or more injection products or additives dispersed into the carrier substance, for instance herbicides, pesticides, fertilizers or the like to provide an agricultural product. The reservoir communicates the agricultural product to the multiple sprayer nozzles with intervening boom tubes.

In some examples, each spray nozzle includes a control valve and an associated spray tip. The control valve provides a specified flow rate of the carrier fluid and an injection product (collectively an agricultural product) to the spray tip. In other examples, the control valve is operated to open and close based on a duty cycle (e.g., opening and closing segments per unit time, such as per second). The spray tip of the sprayer nozzles is configured to apply the agricultural product from the control valve with a spray pattern. In operation, the control valve provides the specified flow rate of the agricultural product for spraying from the spray tip. For instance, the control valve is operated with a duty cycle of opening and closing values (e.g., fully on, fully closed, partially on or the like) intended to deliver the specified flow rate of agricultural product to the spray tip.

SUMMARY

The present inventors have recognized, among other things, that a problem to be solved can include dynamically controlling (including one or more of changing or maintaining) droplet size while at the same time adjusting to changes in flow rate because of one or more of changing application specifications, changing agricultural product composition (e.g., change in quantity of additives with carrier fluid) or the like. For example, wind causes a perturbation of sprayed agricultural product referred to as spray drift. The spray droplets are blown outside of a specified spray pattern and accordingly fail to contact (or poorly contact) a target such as a crop, weed, pest, ground or the like. In other examples, the sprayed agricultural product may have a beneficial effect for a specified crop and have detrimental effects for other crops in adjacent fields. Accordingly, spray drift of the agricultural product should be decreased.

In other examples, agricultural product is applied with varied droplet sizes to address a first issue, such as spray drift. An operator may adjust spray tips or other sprayer settings to generate spray droplets as desired based on their application conditions and design constraints of the spray tip. The operator for instance may adjust parameters to create larger spray droplets. The larger spray droplets have increased mass and are less affected by wind that may otherwise promote spray drift. The large spray droplets provide decreased coverage in some circumstances. For instance, the large droplets deflect from leaves, stalks or the like of targets (e.g., crops, weeds or the like). In contrast, the operator may choose to create smaller spray droplets, as smaller droplets provide a corresponding finer spray, and the droplets adhere to leaves or stalks more readily that larger droplets.

As noted above, the operating environment of the agricultural sprayer is dynamic. Variations in height in the field affect coverage because a preset spray pattern is based on static heights, and in practice the boom height and target height are dynamic and can vary considerably, especially with sprayer booms having articulating joints that permit variations in boom height along the sprayer boom. Additionally, environmental conditions dynamically change, and a relatively small droplet size and corresponding settings for a calm operating environment are not sufficient as weather conditions change, the sprayer reaches the crest or top of a hill (where higher winds are more typical) or the like. Conversely, relatively large droplets sizes may provide poor target coverage because of deflection, poor filling of a spray pattern or the like and may be unnecessary for application in calm winds or while the agricultural sprayer travels in the lee of a hill.

Additionally, system specifications may change during performance of an agricultural operation. The flow rate of agricultural products changes accordingly to changes in prescription (e.g., for targeted spraying application, zone based spraying or the like). The composition of an agricultural product (e.g., a carrier fluid and one or more additives, also referred to as injection products) may change and accordingly change a flow rate to one or more nozzles. The change in flow rate, whatever the basis, along with changes in pressure (e.g., to drive additional or less product through the nozzle) interact with the nozzle and accordingly change droplet size. In some examples, the change in droplet size or the like is not specified and may negatively affect application (e.g., droplets are small and drift or large and deflect from the target).

Further, in most examples an operator cannot reasonably arrest or slow operations to adjust droplet size (including the varied characteristics that affect droplet size), spray patterns or the like and at the same time efficiently conduct agricultural operations. For instance, tuning spray tips to different droplet sizes (or other aspects of spray profiles) based on changes in flow rate, wind or the like often requires manual setting of each spray tip by the operator, and agricultural sprayers often have dozens of spray tips that require manual setting.

In still other examples, spray tips are rated for operation in a specified pressure range (e.g., 15-60 pounds per square inch) to provide a corresponding spray profile, such as droplet size. Sprayers may drive at relatively high speeds, and accordingly increased pressure is specified to ensure delivery of a specified quantity of the agricultural product in a specified area, such as gallons of product per acre. At higher pressures, for instance at or above the specified pressure range for a spray tip, the tip spray profile degrades and droplets may become fine enough that they are subject to spray drift. In other examples, the spray tip, even at higher pressures, is unable to spray the specified flow rate of the agricultural product. Conversely, at low speeds the spray tips operating at lower pressures than specified may apply the agricultural product with droplet sizes that are larger than desired. Accordingly, with sprayer operations at varying speeds (e.g., between booms and spray nozzles moving at different speeds relative to each other) maintenance of a specified pressure for the booms (and component nozzles) is specified to facilitate achieving a specified spray profile.

Further still, some example agricultural products specify spraying at relatively high flow rates, and the operator may in some examples change all of the installed spray tips for spray tips having a higher rated flow rate to apply the agricultural product within specifications. Accordingly, operators often manually set spray tips at droplet sizes, spray patterns or the like that are less than ideal, but intended to partially compensate for at least some environmental affects (e.g., winds, terrain variation, crop or weed height variation, specified pressures or flow rates or the like) while providing an adequate (though not ideal) spray profile for a range of flow rates or pressures. In some examples, the less than ideal settings waste agricultural product, provide poor application coverage or both. Alternatively, operators conduct laborious spray tip adjustments, exchange spray tips or the like while interrupting or slowing agricultural operations.

The present subject matter can help provide a solution to these problems, for instance with modulating nozzle assemblies configured to automatically control one or more aspects of a spray profile, such as droplet size, and optionally flow rate as one or more prescriptions, specified flow rates or the like change. The modulating nozzle assemblies described herein include a nozzle base and one or more modulating elements, such as a shuttle, moveably coupled with the nozzle base. The one or more modulating elements are coupled with actuators (referred to herein as operators), and the actuators are in turn coupled with a nozzle controller. The one or more modulating elements form the spray port (e.g., provide for and control the shape, size or the like of the spray port of the spray tip) to accordingly control one or more of droplet size, flow rate, pressure and optionally the spray profile (e.g., droplet size, pattern or the like). For instance, the one or more modulating elements include a shuttle having a shuttle edge and the nozzle base includes a base edge. The shuttle edge and base edge are components of the spray port, for instance the edges form an adjustable spray tip (in contrast to orifices, valves or the like that are proximal/upstream to the spray tip), and movement of one or both edges relative to the other controls the spray port profile of the spray port (e.g., one or more of the shape or size of the spray tip) and thereby controls a spray profile, such as droplet size, kinematics, pattern or the like, and optionally flow rate and pressure. In an example, the shuttle and base edges that form the spray port are the distal (or last) components that interface with the agricultural product and actually transition the product from liquid to sprayed droplets.

As provided herein, changes in one or more of flow rate, pressure, droplet size, environmental conditions, prescription or the like are inputs to the nozzle controller. For instance, an application prescription may provide an initial flow rate, pressure and droplet size. In other examples, wind speed and direction (determined with droplet kinematic analysis, weather reporting or the like), target height or the like are inputs that may refine droplet size. The nozzle controller receives one or more of these inputs (including a value reflecting these inputs) and dynamically controls the one or more modulating elements (e.g., the shuttle with the shuttle edge, base edge of the nozzle base or the like) with the actuators to provide one or more of the specified droplet size, flow rate, or pressure based on the inputs. For example, the shuttle opens and closes the spray port between fully open, fully closed positions and intermediate positions therebetween. Control of the modulating spray nozzle permits maintenance of a specified spray profile while one or more of flow rate or pressure change. In another example, spray nozzles are moved at different speeds (e.g., during turns according to positions along booms). The modulating spray nozzles described herein permit the maintenance of spray profiles for each of the nozzles while also having greater flow rates with faster moving nozzles and lower flow rates with slower moving nozzles. Optionally, pressure is controlled (maintained, varied or the like) across the modulating spray nozzles (e.g., in combination with spray profiles) while varying flow rates, for instance because of variations in speed.

In one example, an increased flow rate is specified by arrival of the modulating nozzle in a forthcoming field zone having a prescription with the increased flow rate (e.g., relative to a preceding lesser flow rate). In another example, a greater amount of additive is specified by the prescription to increase the concentration of the additive in the agricultural product. The prescription further specifies the droplet size should remain the same (e.g., fine, coarse, ultrafine or the like) from the preceding zone to the forthcoming field zone. The nozzle controller, or optionally a system controller (another example of a nozzle controller), receives the increased flow rate, additive increase and specified droplet size and accordingly initiates movement of the shuttle with the actuator to open the spray port to allow for the increased flow rate and additive increase while at the same time maintaining the specified droplet size (conversely, not opening the spray port would decrease droplet size due to the increased flow and pressure at the port). The increase in flow rate and additive also increase pressure, and accordingly the spray port is opened by the shuttle to maintain the droplet size. Optionally, with one or more environmental conditions, such as winds above a threshold value (e.g., 10 miles per hour, 15 miles per hour or the like or corresponding perturbations reflected in droplet kinematics) the specified droplet size is refined to an updated larger droplet size and the shuttle is further moved (opened) to increase the droplet size.

In another example, a decreased flow rate is specified in a forthcoming field zone, and a different additive is added to the base agricultural product to address another target (e.g., a weed, pest or the like). Additionally, the wind speed upon entering the forthcoming zone falls below a threshold value (e.g., 10 mph, 15 mph or the like or corresponding perturbations reflected in droplet kinematics). The droplet size for the forthcoming zone remains static, however the characteristics at the nozzle change to achieve the droplet size. In this example, the addition of the different additive increases flow rate while the prescribed decreased flow rate for the zone decreases flow rate. Accordingly, in this example, the nozzle controller moves the shuttle and its shuttle edge to a position approaching closed, that is refined conversely open by the addition of the different additive, to maintain the specified droplet size. Additionally, with the wind speed falling below the threshold value the droplet size is, in another example, further decreased to enhance application adhesion by further moving the shuttle and shuttle edge toward the closed position. The shuttle edge is moved further toward closed to decrease the port profile of the spray port (e.g., the actual spray tip) and thereby decrease droplet size and compensate for the falling wind speed.

In an additional example, flow rates between spray nozzles at different locations on a spray boom or along different spray booms may vary widely. For instance, along an interior of a turn the distal interior spray nozzles may move at much slower speeds (e.g., 0.2 miles per hour) relative to the distal exterior spray nozzles on an opposed boom (e.g., moving at 35 mph). Because of the speed of the distal most exterior spray nozzles and the corresponding need for increased coverage in the field these spray nozzles should receive a greater flow rate of agricultural product. If the spray nozzles are not equipped to accommodate the greater flow rate spray coverage may suffer. Further, the spray nozzles receiving the greater flow rate of agricultural product may also receive the product at enhanced pressures and the spray nozzles create a fine spray that is subject to spray drift. Conversely, the distal interior spray nozzles should receive less agricultural product, in other words a decreased flow rate. However, with the decreased flow rate to the distal interior spray nozzles the spray pattern may suffer as pressure decreases and the spray droplets become larger than specified. In this example, coverage of the target crop suffers, the angle of the spray pattern changes outside of specification (decreases), or droplets are concentrated in one portion of the pattern and weak (less dense) in another portion.

The modulating spray nozzles described herein address these issues by controlling the spray ports dynamically in a manner that accommodates variations in one or more of flow or pressure and at the same time provide specified spray profiles along each of the spray booms. For example, the distal exterior spray ports formed by the shuttle and base edges are opened to provide an enlarged spray tip to accommodate the increased flow and maintain a specified droplet size (instead of transitioning to a finer droplet size). Optionally flow to the spray port is further controlled with one or more control valves. At the same time, the shuttle and base edges control the port profiles of the ports of the spray tips to spray the agricultural product at the specified droplet size. In contrast, the distal interior spray ports formed by the shuttle and base edges are constricted to accommodate the decreased flow rate and also form spray tips that spray the agricultural product at the specified droplet size (instead of transitioning to a coarser droplet size). The variations in port profiles of the spray ports (e.g., the spray tips) are in examples graduated or varied along the spray booms to accommodate graduated variations in flow rate while at the same time maintaining a consistent spray profile (e.g., consistent droplet size) for each of the modulating spray nozzles. The modulating spray nozzles described herein thereby accommodate wide variations in flow rate, pressure (or both) across the spray booms and at the same time provide consistent spray profiles from the component spray nozzles of the spray booms.

The modulating nozzle assemblies described herein in combination with the nozzle assembly controllers permit ongoing automated control of sprayer performance in response to various factors that may otherwise negatively affect sprayer performance. For instance, spray drift caused by wind is detected with tracking of droplet kinematics, weather reporting, position or the like. Detected spray drift is, in one example, addressed with active control of the modulating nozzle assembly modulating element (e.g., shuttles, orifice plates or the like) to increase droplet size.

In other examples, deflection of agricultural product at the target (e.g., canopy, leaves, stalks or the like) is detected with tracking of droplet kinematics including scattering proximate to the target. Deflection is, in one example, addressed with control of the modulating nozzle assemblies to decrease droplet size (e.g., move one or more of the modulating elements and thereby partially close the spray port). The smaller droplets generated from the spray port having the smaller port profile more readily adhere to the target thereby decreasing deflection.

In still other examples, changes in flow rate of the agricultural product varies the spray profile. For instance, an increased flow rate correspondingly increases pressure and, without control of a spray modulating element, causes a decrease in spray droplet size from specifications. Conversely, a decreased flow rate, decreases pressure, and causes an increase in spray droplet size.

The modulating nozzle assemblies and nozzle controllers described herein provide automated control of spray profile performance, such as droplet size (including maintenance of droplet size and specified changes), based on a variety of inputs (e.g., prescription, flow rate, pressure, environmental conditions, changes of the same or the like). The modulating nozzle assemblies permit ongoing spraying operations while decreasing waste or misapplication of agricultural product and at the same time enhancing the application of agricultural product all while minimizing interruption of operations to laboriously change sprayer settings.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
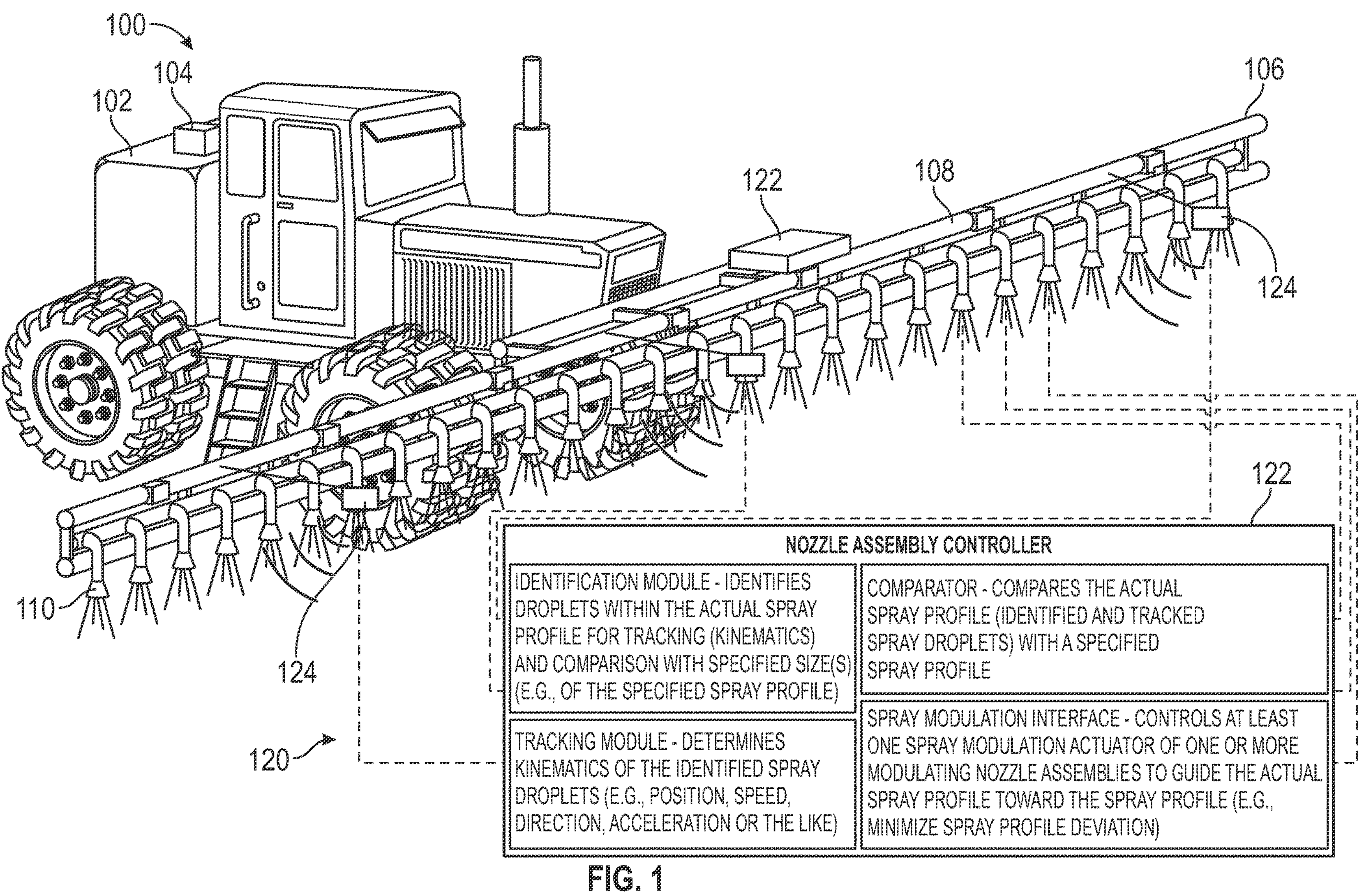
FIG. 1 is a schematic view of one example of an agricultural sprayer including a nozzle assembly controller.
Figure 2:
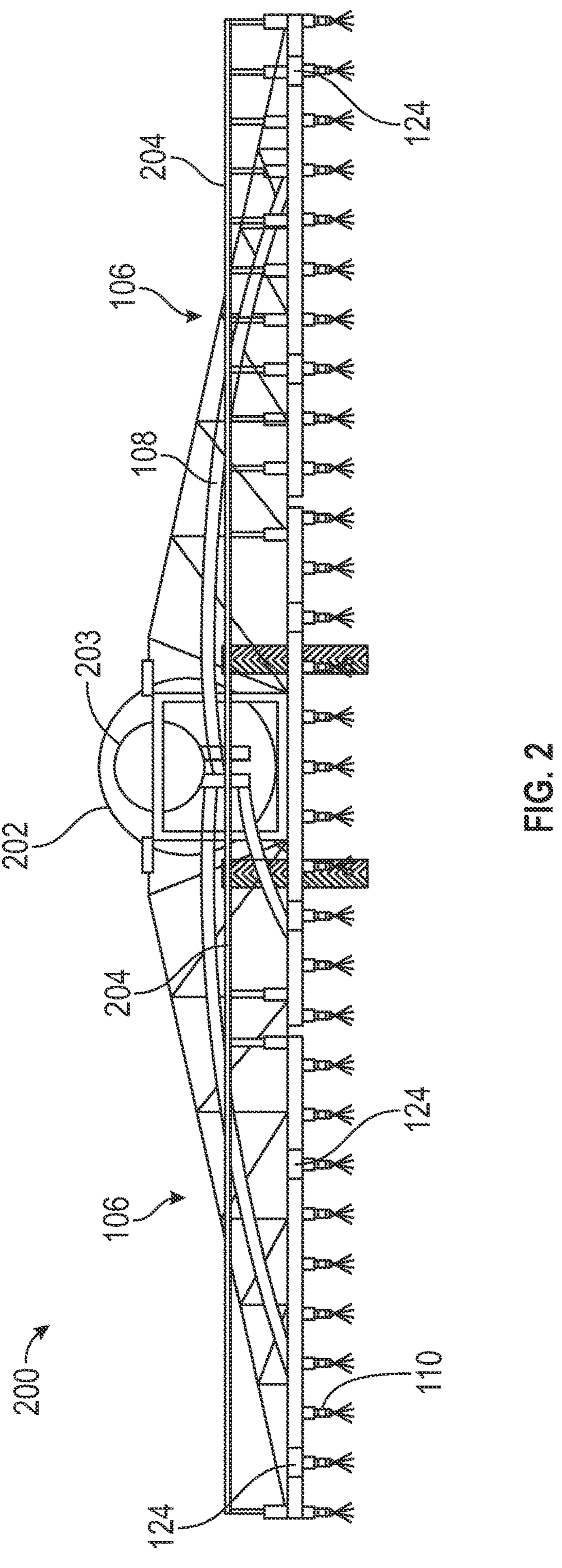
FIG. 2 is a schematic view of another example of an agricultural sprayer.

FIG. 1 is a perspective view of one example of a sprayer nozzle assembly control system 120 provided with an agricultural sprayer 100. The agricultural sprayer 100 includes an agricultural product reservoir 102. The agricultural product reservoir 102 includes one or more of a carrier fluid reservoir (e.g., for water, a base agricultural product or the like), an injection product reservoir(s) (e.g., for additives to add to the carrier fluid for modulation of composition and concentration), premixed agricultural product reservoir or the like. A pump 104 is in communication with the agricultural product reservoir 102. The pump 104 includes one or more of a system pump, intermediate pumps (e.g., associated with booms or portions of booms and the associated nozzles) or the like. The pump 104 pressurizes and distributes the agricultural product of carrier fluid and injection products to the sprayer booms 106 for application through spray nozzles 110, such as the modulating nozzle assemblies described herein. In other examples, for instance as shown in FIG. 2, the pump 104 includes multiple pumps configured to separately supply the carrier fluid and the one or more injection products to the sprayer boom for localized injection of the injection products (e.g., additives) to the carrier fluid at the sprayer booms 106, subsets of the spray nozzles 110, or at each of the spray nozzles 110 (e.g., each of the modulating nozzle assemblies described herein) thereby permitting discrete control of composition and concentration at one or more of the spray nozzles 110 relative to other spray nozzles 110.

As further shown in FIG. 1, the sprayer booms 106 include spray nozzles 110. The spray nozzles 110 apply the agricultural product in a spray pattern having specified droplet sizes (e.g., diameter, profile, unitless numbers or the like corresponding to the size of droplets). The spray nozzles 110 include modulating nozzle assemblies as described herein configured to control one or more characteristics of an actual spray profile including, but not limited to, droplet size, droplet kinematics (e.g., through droplet size), spray pattern or the like. The modulating nozzle assemblies include spray modulating elements (e.g., shuttles, blocks, plates or the like, herein sometimes referred to as shuttles) that control the spray profile emanated from the modulating nozzle assemblies including, but not limited to, one or more of droplet size or flow rate. The modulating nozzle assemblies include an operator (e.g., dial, knob, motor or the like) that actuates the spray modulating element to provide one or more of discrete control of droplet size, ongoing droplet size control, flow rate control, pressure control or the like.

Additionally, in some examples the spray modulating elements, associated operators or the like control flow rate from the modulating nozzle assemblies, for instance through closing and opening movement of the spray modulating elements, such as the shuttles described herein. As provided herein, control of flow rate with the modulating nozzle assemblies permits dynamic control of flow rate of nozzles along a sprayer boom (including discrete control of each nozzle), for instance during turns with the sprayer, while at the same time permitting control of the spray profile (e.g., droplet size). In another example, flow rate is controlled with one or both of the spray nozzles and other components of the sprayer system, including pumps, orifices or the like. In another example, the spray nozzles 110 (including modulating nozzle assemblies) are components of the sprayer nozzle assembly control system 120.

An example of a sprayer nozzle assembly control system 120 is shown in FIG. 1. The system 120 includes a nozzle assembly controller 122 in communication with the spray nozzles, such as the modulating nozzle assemblies 110. Additionally, one or more spray sensors 124 are provided with the system 120 and configured to observe actual spray profiles of the agricultural product emanating from the modulating nozzle assemblies 110. As described herein, the nozzle assembly controller 122 analyzes observations made with the spray sensor 124, for instance see droplet identification and tracking 918 associated with the spray sensor 914 in FIG. 9). The spray sensors 124 are provided at one or more locations relative to the modulating nozzle assemblies 110 to observe at least one (potentially multiple) actual spray profiles. As shown in FIG. 1, multiple spray sensors 124 are provided along the sprayer boom 106 to permit observation of actual spray profiles at interior and peripheral (outlying) locations along the boom 106.

In addition to observing the actual spray profile, the spray sensor 124 in some examples monitors one or more of spray boom height (relative to a target or reference, such as crops, ground or the like), target height (relative to the spray boom or ground) or the like. The spray sensors 124 include, but are not limited to, cameras, video cameras, ultrasound sensors, laser, LIDAR, radar or the like with the capability of observing the actual spray profile and permitting identification of droplets and their size; tracking movement of the droplets; assessing spray profile shape or arc; observing crops, crop height or the like; boom height or the like.

The spray sensors 124 are in communication with the nozzle assembly controller 122, and the controller 122 is in communication with the modulating nozzle assemblies 110. The nozzle assembly controller 122 includes a comparator configured to determine deviations of one or more actual spray profiles relative to a specified spray profile(s), for instance see the example deviations 902 in FIG. 9. The nozzle assembly controller 122 operates the modulating nozzle assemblies 110 and controls spray modulating elements associated with the modulating nozzle assemblies 110 to change actual spray profiles, for instance based on the determined deviation. Optionally, the nozzle assembly controller 122 includes a plurality of nozzle assembly controllers associated with one or a subset of the modulating nozzle assemblies 110.

In the example architecture shown in FIG. 1, the nozzle assembly controller 122 includes an identification module, and the identification module identifies droplets within the actual spray profile (or profiles) observed with the spray sensors 124. The identification module identifies droplets, for instance discriminating between droplets to permit tracking of the droplets between successive observations (e.g., images, scans or the like) from a sensor 124. Additionally, the identification module is configured to determine the size of identified droplets. The identification module, in one example, observes droplets and identifies droplets that follow a predicted trajectory or path between images. The identification is optionally confirmed or given a higher confidence based on assessment of droplet size between images. For instance, a droplet following a predicted trajectory and having a consistent size between images has a higher likelihood (confidence value) of being the same droplet than a droplet that has an unpredicted trajectory or differences in droplet size between images or the like. In another example, the identification module observes droplets between images and identifies droplets between images based on identity of droplet size between the images. Optionally, the identification is then confirmed based on the trajectory of the droplets following a predicted trajectory.

In the example system 120, the nozzle assembly controller 122 tracks identified droplets with a tracking module. The tracked droplets have associated kinematics determined, in one example, with position indexing between two or more observations and associated vector calculations. Derivation of the vectors permits determination of additional characteristics including, but not limited to, acceleration, forces (with acceleration and mass of droplets based size determination) or the like.

Figure 9:
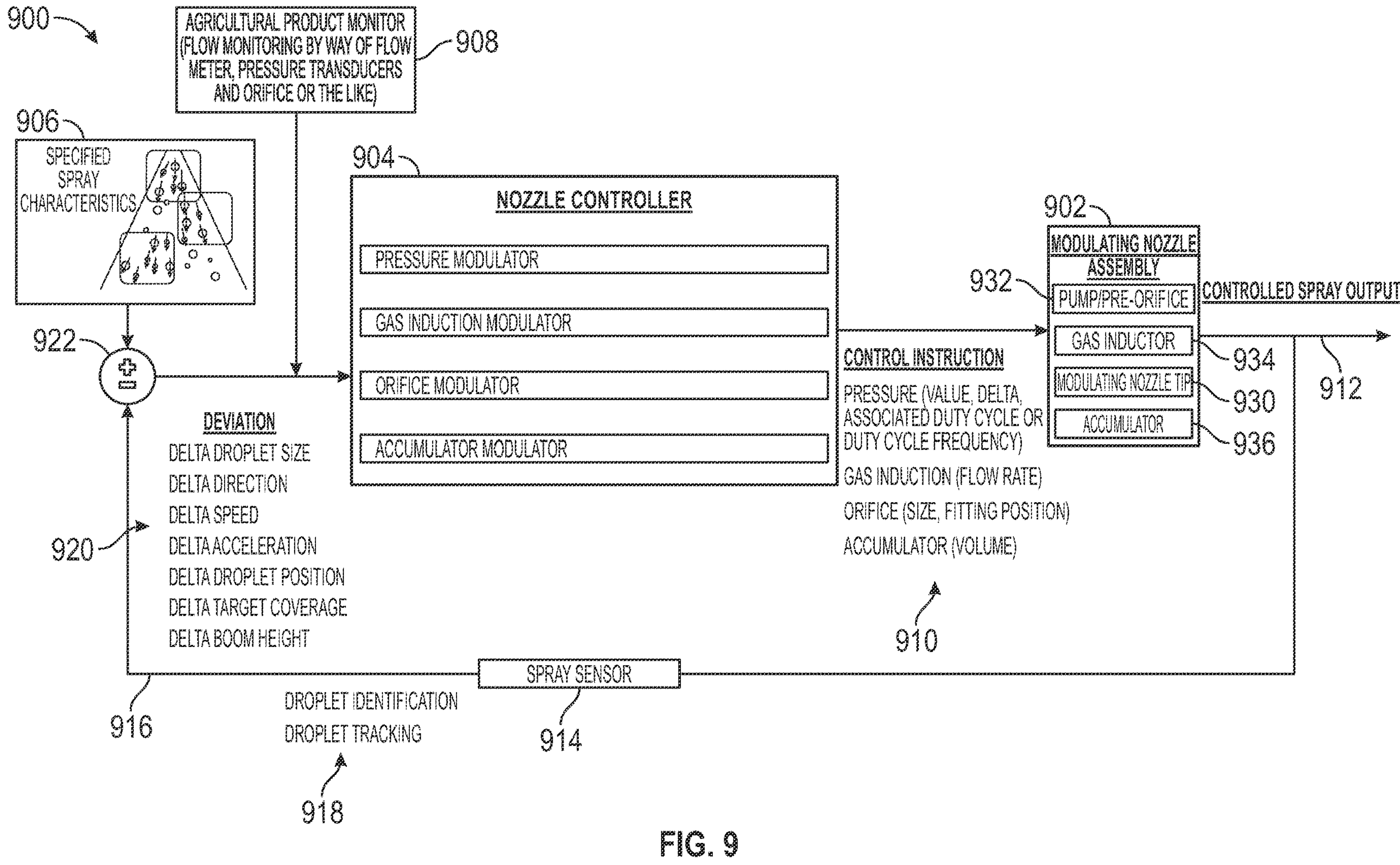
FIG. 9 is a schematic view of one example of a nozzle control system.

The nozzle assembly controller 122 further includes a comparator that compares the actual spray profile of the identified and tracked spray droplets with a specified spray profile having one or more of a specified droplet size (including range of sizes), specified kinematic characteristics (e.g., position, speed, acceleration or the like), spray pattern or the like. The comparison provides a spray profile deviation of the actual spray profile relative to the specified spray profile. The spray profile deviation in various examples includes one or more determined values (component deviations) including deviation in droplet size, deviation in droplet kinematics, deviation of the spray pattern or the like having unit quantities (e.g., dimensions, kinematics, degrees, respectively). In other examples, the component deviations are unitless to permit weighted combination of the component deviations into an overall spray profile deviation value. Example spray profile deviations 920 are shown in FIG. 9.

The one or more determined spray profile deviations are provided to the spray modulation interface of the nozzle assembly controller 122 to initiate control of at least one spray modulating element of one or more modulating nozzle assemblies 110 to guide the actual spray profile toward the specified spray profile (e.g., decrease spray profile deviations). The modulating nozzle assemblies 110 include one or more spray modulation elements including, but not limited to, a control valve (as an example of a pre-orifice); a modulating spray tip, for instance having a shuttle, orifice plate as described herein or the like; a modulating accumulator; a gas inductor or the like. The spray profile deviations correspond to one or more control instructions that operate the actuators, for instance to maintain the actual spray profile (e.g., if there is minimal or no deviation) or adjust the actual spray profile, including conducting changes of droplet size, spray pattern or the like, to decrease the deviation between the specified spray profile and the actual spray profile. In one example, the observation, assessment of deviation and implementing of control of the one or more modulating spray elements is conducted with feedback control. An example of the controller with feedback control is provided in FIG. 9. In another example, the nozzle assembly controller 122 provides different control instructions to each of the modulating nozzle assemblies 110 (including subsets of assemblies) based on the actual spray profile observed for the respective assemblies.

FIG. 2 is another example of an agricultural sprayer 200 configured for use with the sprayer nozzle assembly control system 120. In this example, the sprayer 200 includes sprayer booms 106 and boom tubes 108 in communication between a carrier fluid reservoir 202 and the modulating nozzle assemblies 110 provided along the sprayer booms 106. Additionally, this example sprayer 200 includes one or more injection product reservoirs 203 having a quantity of injection product for controlled introduction to the carrier fluid (e.g., water, premixed agricultural product or the like). As shown in FIG. 2, the injection product boom tubes 204 extend from the injection product reservoir 203 to the modulating nozzle assemblies 110. The injection product, separated from the carrier fluid by the boom tubes 202, 203, is injected locally to the carrier fluid to provide one or more of composition or concentration control for one or more injection products at the modulating nozzle assemblies 110.

In a similar manner to the sprayer 100, the agricultural sprayer 200 includes a sprayer nozzle assembly control system 120 (see FIG. 1) including a nozzle assembly controller 122 in communication with one or more of the modulating nozzle assemblies 110. As further shown in FIG. 2, one or more spray sensors 124 are provided proximate to the modulating nozzle assemblies 110. The spray sensors 124 are configured to observe one or more actual spray profiles emanating from the modulating nozzle assemblies 110 and provide the observations of the actual spray profile to the nozzle assembly controller 122. The nozzle assembly controller 122 identifies one or more of droplets, the spray pattern or the like of the actual spray profile and provides one or more spray modulation actuation control instructions to the modulating nozzle assemblies 110 to address deviation of the actual spray profile relative to a specified spray profile. Optionally, the nozzle assembly controller 122 provides different control instructions to each of the modulating nozzle assemblies 110 (including subsets of assemblies) based on the actual spray profile observed for the respective assemblies.

Figure 3:
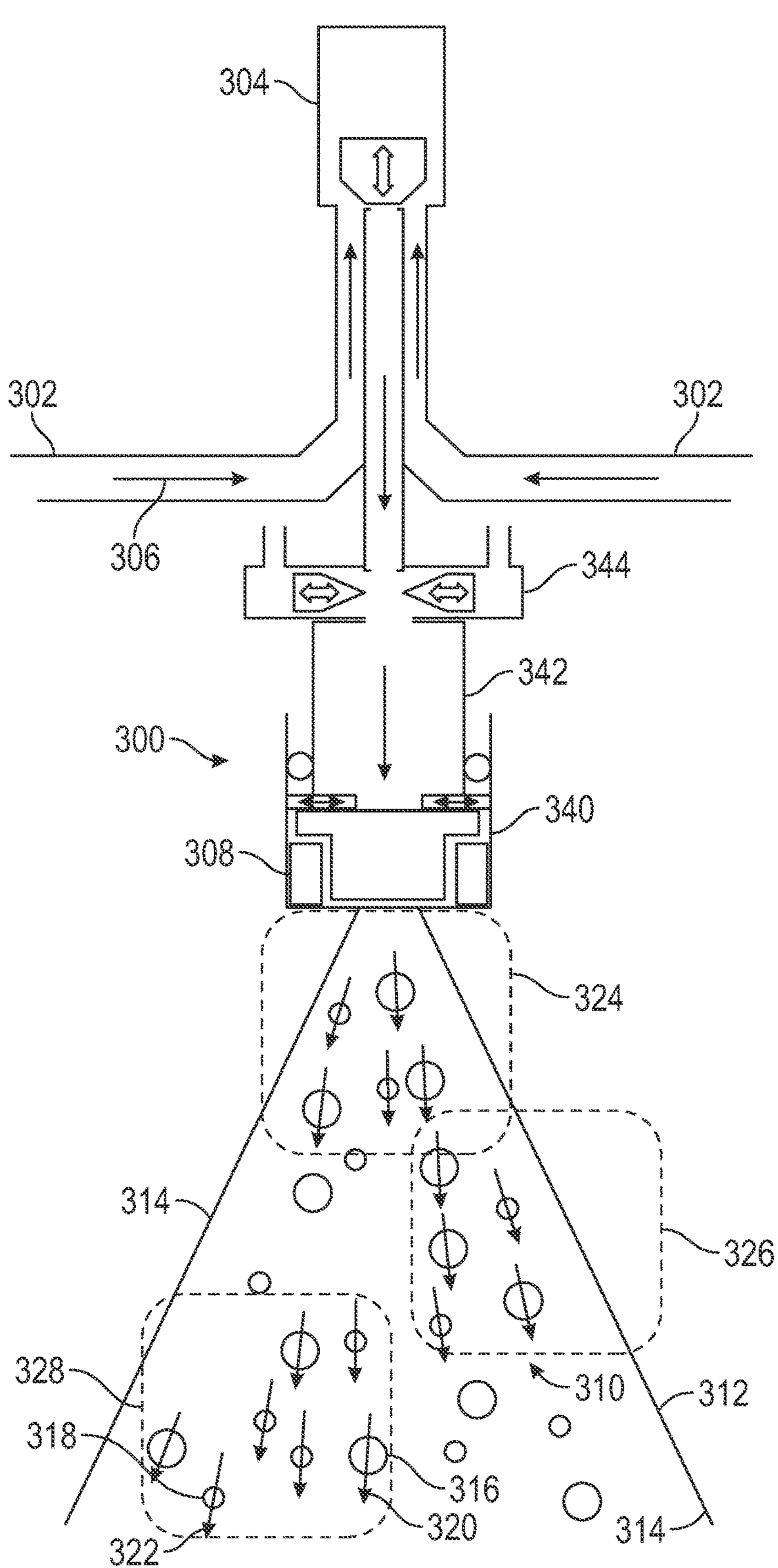
FIG. 3 is a schematic view of one example of a modulating nozzle assembly.

FIG. 3 is a schematic view of an example modulating nozzle assembly 300. The assembly 300 includes multiple example spray modulation elements. In the example shown in FIG. 3, an example specified spray profile 312 is shown emanating from the modulating nozzle assembly 300. The specified spray profile 312 is shown with one or more specified spray characteristics including, but not limited to, spray droplet size (including a range of droplet sizes), droplet kinematics (direction, velocity or the like) or spray pattern (arc or shape).

The specified spray profile 312 is also shown with a plurality of optional monitoring sections 324, 326, 328. In an example, a spray sensor (like the spray sensor 124 in FIG. 1) observes the spray profile 312, captures video, images or the like, and analysis is conducted at one or more locations of interest within the video or images. For instance, in the view shown in FIG. 3, locations of interest include section 324 proximate the spray port 308 (having a modulating spray port profile as discussed herein), where the spray pattern is initially generated. Additional example locations of interest are shown with sections 326 and 328. Section 326 is proximate a pattern edge 314 (right) of the spray pattern 312, and second section 328 is proximate the opposed edge 314 (left) of the spray pattern 312. Accordingly, characteristics of droplets near to the pattern edges (where spray drift may be most pronounced) are determined. In another example, one or more sections, like section 328, are proximate to a target, such as crops, pests, weeds, ground or the like. Section 328 permits observation and analysis of droplets proximate to these targets, including deflection of spray droplets from targets.

Referring again to FIG. 3, the specified spray profile 312 is one example of a spray profile used as a threshold or basis for comparison with actual spray profiles, for instance to facilitate automatic control of the modulating nozzle assembly 300 that guides performance of the assembly to generate an actual spray profile that approximates (e.g., matches, approaches or the like) the specified spray profile 312. The specified spray profile 312 includes one or more spray characteristics that serves as thresholds or permit the generation of thresholds for comparison against the corresponding actual spray characteristics of an actual spray profile, for instance observed with the spray sensors 124 and analyzed with the nozzle assembly controller 122 as noted herein.

In the example shown in FIG. 3, the specified spray profile 312 includes one or more component spray characteristics including, but not limited to droplet size, droplet kinematics and spray pattern. The droplet size characteristic includes a specified droplet size (dimension, profile identifier, such as coarse, fine or the like; array of sizes; ratio of sizes large: small, coarse:fine, ultracoarse:coarse:fine:extremely fine)) or the like. In other examples, the droplet size characteristics includes a distribution of droplet sizes, such as a geometric, normal, exponential, Poisson distribution or the like. The droplet size characteristic is an example threshold for comparison against the actual spray profile.

In the example shown in FIG. 3, the droplets 316, 318 are different sizes, and each is included with the specified spray profile 312. Accordingly, the specified spray profile 312 includes at least two permitted droplet sizes, and in other examples, the spray profile 312 permits a range of droplet sizes including the sizes shown with the droplets 316, 318 (e.g., as permitted outliers; first quartile and fourth quartile sizes, or the like). In still another example, the spray droplets 316, 318 are indicative of a specified distribution or range of droplet sizes with the spray droplet 316 the median value for size, the spray droplet 318 one standard deviation of size to the right of the spray droplet 316, and the remainder of the distribution populated according to the type of distribution used (e.g., normal, Poisson, or the like). Droplet size characteristics are provided to facilitate comparison with corresponding size characteristics of actual spray profiles and thereby determine one or more spray profile deviations between the specified spray profile 312 and the actual spray profile for use as inputs to the modulating nozzle assembly 300.

The specified spray profile 312 droplet kinematics 320, 322 are additional examples of spray characteristics optionally included with the profile 312 as thresholds for comparison with an actual spray profile. In the example shown in FIG. 5, the droplet kinematics 320, 322 include, but are not limited to, one or more of position, direction, speed, acceleration or the like. As shown, the kinematics are indicated with example vector arrows with the origin of an arrow corresponding to a droplet position, the direction and magnitude of the vector correspond to direction of movement and speed, respectively, while other characteristics like acceleration are input or determined mathematically from other kinematic characteristics (e.g., velocity). In a similar manner to the droplet sizes, droplet kinematics are optionally provided as one or more values, ranges, distributions or the like to facilitate comparison with corresponding characteristics of actual spray profiles and thereby determine one or more spray profile deviations between the specified spray profile 312 and the actual spray profile for use as inputs to the modulating nozzle assembly 300.

As further shown in FIG. 3, the specified spray profile 312 includes a spray pattern as another example of a spray characteristic. The spray pattern is illustrated with the pattern edges 314. The pattern edges 314 are indicative of specified boundaries of the specified spray profile 312. The pattern edges 314 are shown as lines in FIG. 3. The actual spray profile 312, in some examples, includes the pattern edges 314 as arc or degree values measured from vertical or another reference, a width dimension of the spray profile a specified distance from the modulating spray tip 540 or the like. The spray pattern, such as the pattern edges 314 is provided to facilitate comparison with the pattern of the actual spray profile and determine whether the actual spray profile is wide, narrow, angled or the like relative to the specified spray profile 312. Spray profile deviations between the specified spray profile 312 (e.g., the spray pattern) and the actual spray profile spray pattern are use as inputs to the modulating nozzle assembly 300, as described herein. The specified spray pattern varies in some examples based on boom height, with tighter (smaller) arcs used at greater boom heights and wider (larger) arcs used at lesser boom heights to ensure coverage of targets (plants, crops, weeds, ground or the like).

Figure 4B:
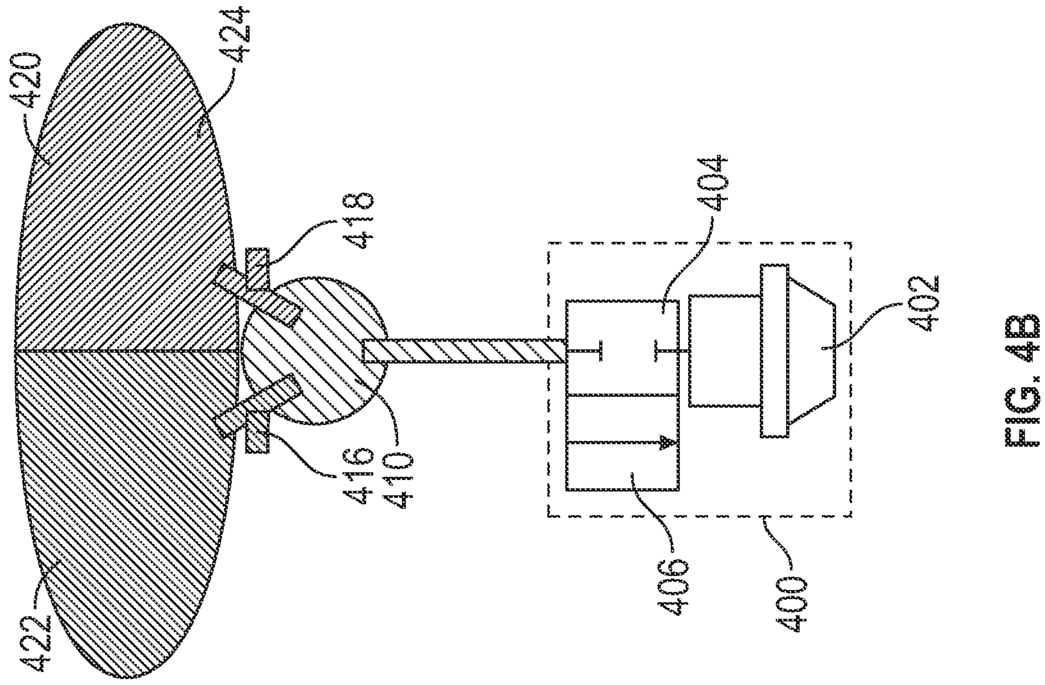
FIG. 4B is a schematic view of the modulating nozzle assembly of FIG. 4A coupled with a composite boom tube.
Figure 4A:
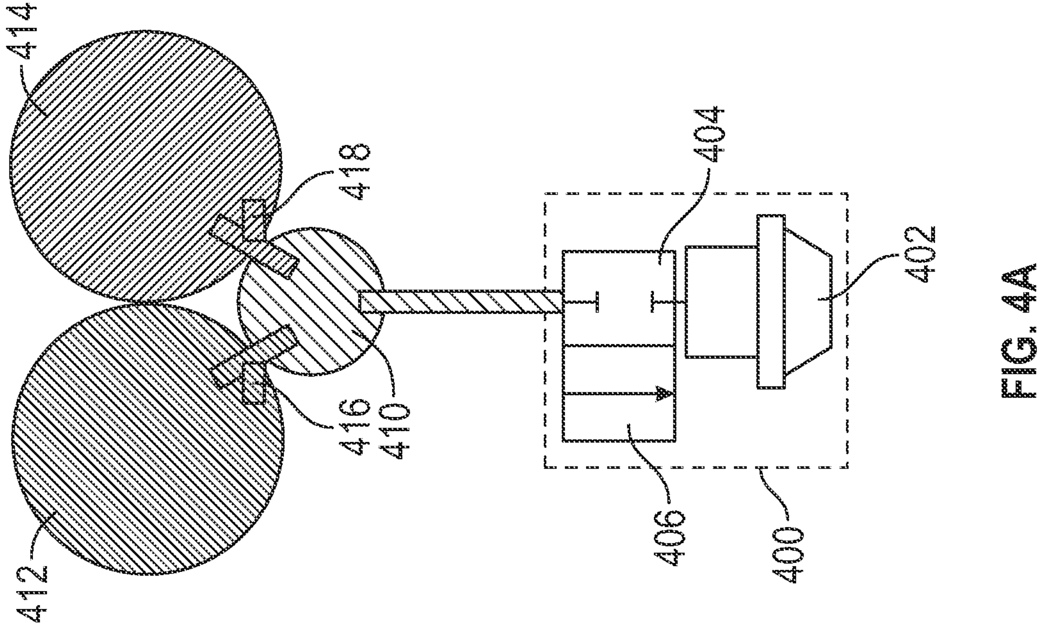
FIG. 4A is a schematic view of a modulating nozzle assembly coupled with first and second boom tubes.

FIGS. 4A and 4B are schematic views of modulating nozzle assembly 400 coupled with example boom tubes of a sprayer assembly. In FIG. 4A, the modulating nozzle 400 is coupled with a first boom tube 412 and a second boom tube 414. In one example, the first boom tube 412 provides a first fluid, such as a carrier fluid, premixed agricultural product or the like. In another example, the second boom tube 414 provides a second fluid, such as an agricultural product (e.g., different or the same as the ag product in the first boom tube), injection product of an additive or the like. Optionally, one or more flow modulating elements 416, 418, such as valves, are provided between the first and second boom tubes 412, 414 to regulate the flow rate of the respective first and second fluids to downstream components, such as the modulating nozzle assembly 400. In various examples, the flow modulating elements 416, 418 include, but are not limited to, control valves, such as solenoid control valves that provide metered flow of the respective fluids, for instance according to pulse width modulation. The flow modulating element 416, 418 the control of the flow rates of the associated first and second fluids and thereby permit control of composition and concentration of resulting agricultural products that are mixed from the first and second fluids.

As further shown in FIGS. 4A, 4B the boom tubes are interconnected with a mixing chamber 410 that receives the first and second fluids, mixes the fluids, and provides the resulting agricultural product to the modulating nozzle assembly 400. This mixing chamber optionally includes one or more mixing elements including static vanes or blades, a movable mixing element or the like.

Referring now to FIG. 4B, another example boom tube is shown. In this example, the system includes a composite boom tube 420 having two or more component boom tubes separated a septum including one or more interior walls of the boom tube 420, nested tubes or the like. As shown in FIG. 4B, in this example, first and second component boom tubes 422, 424 are provided with the composite boom tube 420. In other examples, two or more component boom tubes are provided with the composite boom tube 420. The component boom tubes 422, 424 provide associated first and second fluids for discrete administration (one of the fluids and not the other); and mixing of the fluids to various compositions or concentrations and associated administration. As with the example in FIG. 4A, the component boom tubes 422, 424 are interconnected with the modulating nozzle assembly 400. Optionally, one or more first or second flow modulating elements 416, 418 control the flow rates of the first and second fluids to the downstream nozzle assembly 400.

A schematic example of a modulating nozzle assembly 400 is shown in each of FIGS. 4A and 4B. The modulating nozzle assembly 400 includes a spray port 402 having a configurable spray port profile that permits changes in one or more of shape, size or the like that accordingly control the actual spray profile (e.g., droplet size, spray pattern, both or the like). An example spray modulating element 404 is shown schematically in FIGS. 4A, B. The spray modulating element controls the spray port 402, for instance the spray port profile.

In operation, as fluids flow from each of the boom tubes (412, 414 in FIG. 4A, and 422, 424 in FIG. 4B) the resulting agricultural product is provided to the modulating nozzle assembly 400. The modulating nozzle assembly 400, for instance the spray modulating element 404 controls the spray port 402 to accommodate changes in flow rate and at the same time provide a specified spray profile (e.g., droplet size, spray pattern, droplet kinematics or the like). For instance, changes in flow rate and associated changes in pressure will change droplet size with a static nozzle. With the controlled modulating nozzle assemblies 400 (and described herein) the changes in flow rate, pressure or the like are accommodated with dynamic control of the spray port 402 (e.g., referred to as the spray port profile, modulating port profile or the like) to maintain a specified droplet size across a range of flow and pressure variations. In one example, the spray modulating element 404 includes a shuttle, orifice plate or the like that is moved in a controlled fashion to change the spray port profile. For instance, as flow rate increases and pressure increases to provide the increased flow the spray port profile of the spray port 402 is increased to permit application of the increased flow while at the same time ensuring pressure at the spray port 402 does not rise in a manner that causes a specified droplet size to decrease. Conversely, as flow rate decreases and pressure decreased to provide the lesser flow the spray port profile of the spray port 402 is decreased to ensure pressure at the spray port 402 does not fall in a manner that causes a specified droplet size to increase.

Figure 5A:
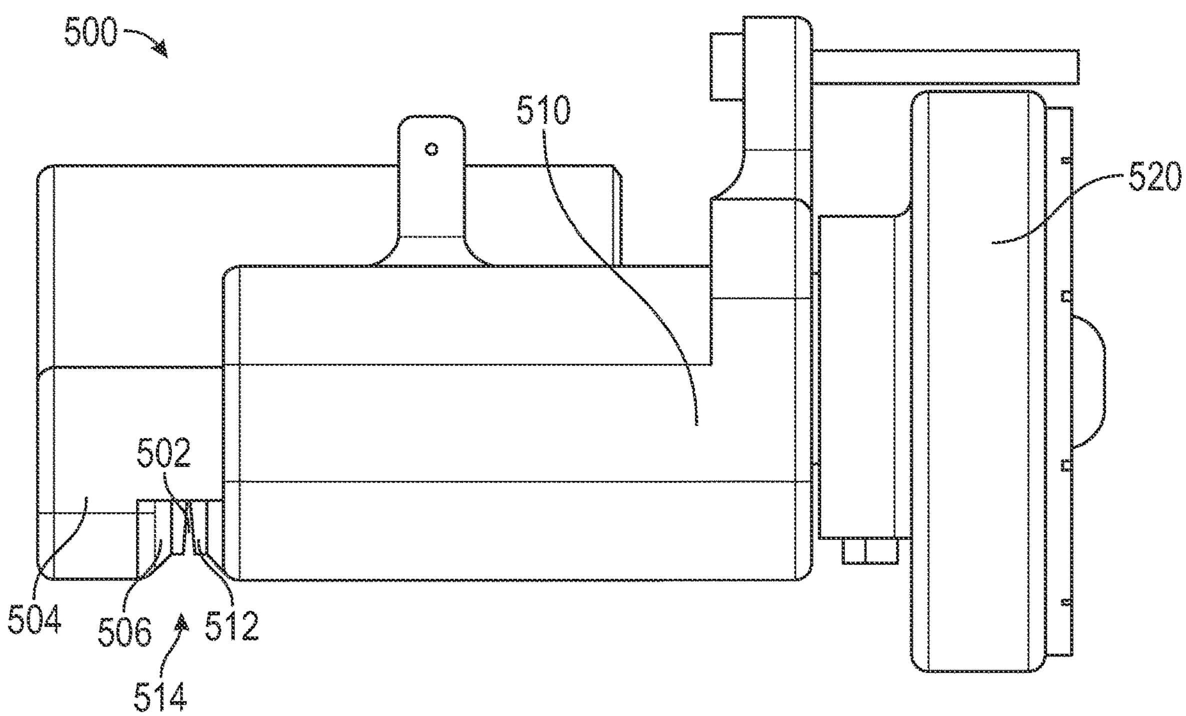
FIG. 5A is a front view of an example modulating nozzle assembly.
Figure 5B:
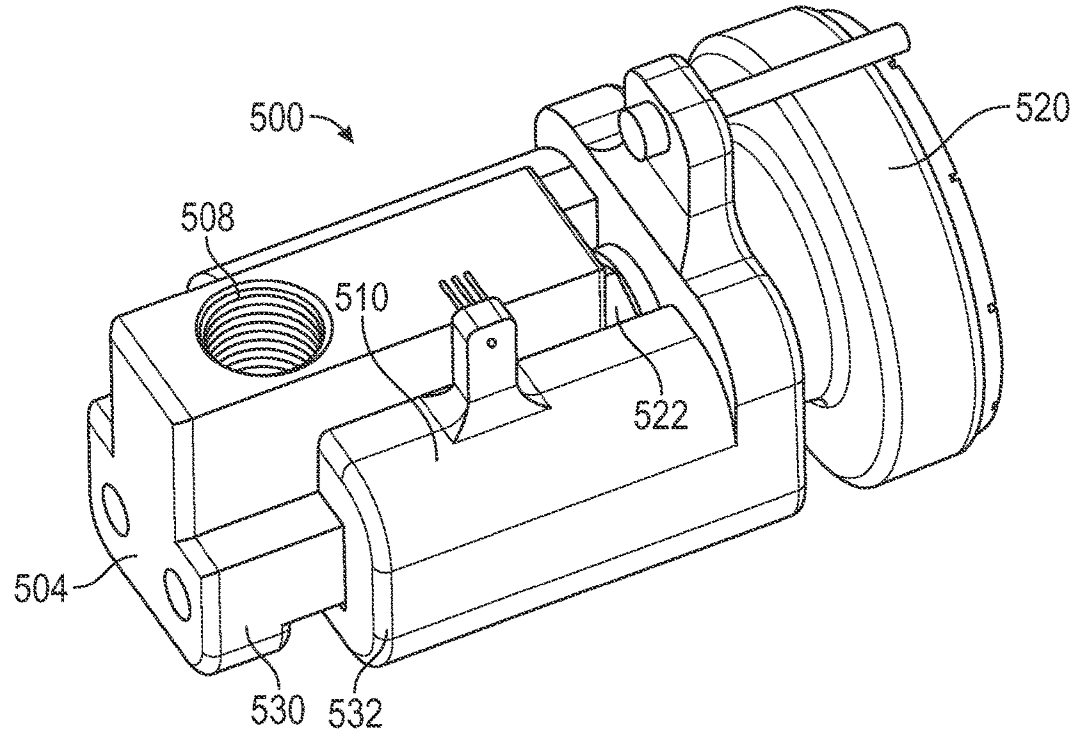
FIG. 5B is a perspective view of the modulating nozzle assembly of FIG. 5A.

FIGS. 5A, 5B are side and perspective views of one example of a modulating nozzle assembly 500 including at least one spray modulating element 510 that controls a spray port 502 in a manner that permits control of an actual spray profile (e.g., droplet size, spray pattern, spray kinematics or the like) emanating from the spray port. The modulating nozzle assembly 500 includes a nozzle base 504. The nozzle base 504, as shown in FIG. 5B, includes one or more input fittings 508. In a first example, the nozzle base 504 includes a single input fitting that receives a flow of agricultural product for sprayed administration at the spray tip 514. In another example, the nozzle base 504 includes a plurality of input fittings that receive separate fluid flows. For instance, a first fitting receives a carrier fluid, such as water, premixed agricultural product or the like, while one or more second fittings receive other fluids including additives such as herbicides, pesticides, fungicides, fertilizers or the like. In these examples, the carrier fluid and one or more other fluids are mixed in the modulating nozzle assembly 500, for instance in a mixing chamber, and administered from the spray tip 514 as a spray having one or more of a specified composition or concentration.

The modulating nozzle assembly 500 includes one or more spray modulating elements 510. In this example, the spray modulating element 510 includes a shuttle (e.g., block, plate, gate or the like) movably coupled with the nozzle base 504. As described herein the spray modulating element 510 is moved with a modulation actuator 522 (see FIGS. 5B, 5C). The actuator 522 is in one example manually moved with the operator 520, such as a knob, dial or the like. In another example, the actuator 522 is coupled with a different operator 520, such as a motor (e.g., servo motor, stepper motor or the like) that permits automated control of the spray modulating element 510. As described herein, the one or more spray modulating elements 510 are positioned at the spray tip 514 and permit control of the spray port profile including, but not limited to, one or more of the shape, size or the like of a spray port 502.

Referring to FIG. 5A, the modulating nozzle assembly 500 includes the spray tip 514 having a spray port 514. Agricultural product is delivered from the spray port 514 in a sprayed form. The actual spray profile of the agricultural product sprayed includes one or more a droplet size (including range of sizes), droplet kinematics (direction, velocity or the like), spray pattern or the like, referred to as spray characteristics. The spray characteristics are controlled by one or more of flow rate, pressure and the spray port profile such as the size, shape or both of the spray port 502. The spray tip 514 includes edges that surround the spray port 502 and control the spray port profile. As shown in FIG. 5A, the spray port 502 in this example includes a base edge 506 of the nozzle base 504 and a shuttle edge 512 of the spray modulating element 510 (the shuttle).

Movement of the spray modulating element 510, for instance with the operator 520 and modulation actuator 522, moves the shuttle edge 512 relative to the base edge 506 of the nozzle base 504. Movement of the shuttle edge 512 accordingly changes the spray port profile, in this example changing one or more of size or shape. As described herein, a small droplet (e.g., ultrafine or fine) control instruction received by the modulating nozzle assembly 500 from the nozzle assembly controller 122 moves the shuttle (as the spray modulating element 510) toward the base edge 506 and contracts the spray port 502. The contracted spray port 502 of the spray tip 514 generates corresponding smaller droplets, presuming one or both of flow rate remain static or are adjusted in a manner that is either helpful or does not frustrate generation of the smaller droplets. Conversely, a larger droplet (e.g., coarse or ultracoarse) control instruction received by the modulating nozzle assembly 500 moves the shuttle (as the spray modulating element 510) away from the base edge 506 and expands the spray port 502. The expanded spray port 502 generates correspondingly larger droplets, presuming one or both of flow rate remain static or are adjusted in a manner that is either helpful or does not frustrate generation of the larger droplets.

In another example, one or more of flow rate or pressure are changed, for instance with a spray controller of the agricultural sprayer 100. In this example, maintenance of a droplet size is specified, for instance the operator or prescription specifies the droplet size remains 'fine' even with variation in one or both of flow rate or pressure at one or more of the modulating nozzle assemblies 500. In these examples, the nozzle assembly controller 122 provides control instructions that expand, contract or maintain the spray port profile in a manner that compensates for variations in one or more of flow rate or pressure. For instance, as flow rate and pressure increase the control instruction expands the spray port 502 through movement of the modulating shuttle element 510. The expanded spray port 502 permits the maintenance of the specified droplet size (e.g., 'fine' droplets). In another example, as flow rate and pressure decrease the control instruction contracts the spray port 502. The contracted spray port 502 cooperates with the decreased flow and associated pressure of the agricultural product to spray 'fine' droplets. In other examples, the flow rate and pressure are independently increased or decreased (e.g., to provide a lower flow rate at a higher pressure, a higher flower rate at a lower pressure, varied degrees of flow rate and pressure or the like) and the modulating nozzle assemblies 500 having the spray modulating element 510, such as the shuttle shown in FIGS. 5A, B are automatically controlled to provide specified droplet sizes even with these changes in one or more of flow rate or pressure.

As described herein, a nozzle control system 900 (see FIG. 9) optionally includes a spray sensor 914. In one example, the spray sensor 914 monitors an actual spray profile and the associated controller, such as the comparator 922 (corresponding to the comparator of the controller 122 in FIG. 1) determines one or more deviations of the actual spray profile relative to a specified spray profile. The nozzle controller 904 generates control instructions for control of one or more spray modulating elements 510 based on the deviations, and the control instructions are implemented at the elements 510 (e.g., the shuttles of nozzle assemblies) to control the spray ports 502 and guide the actual spray profile toward compliance with the specified spray profile.

Referring again to FIG. 5B, in another example, the nozzle base 504 includes one or more features that guide movement of the spray modulating element 510. In this example, the nozzle base 504 includes one or more guide rails 530 that cooperatively couple with rail followers 532 of the spray modulating element 510. The guide rails 530 and rail followers 532 guide movement of the shuttle (element 510) and thereby guide movement of the associated shuttle edge 512, shown in FIG. 5A relative to the base edge 506. In another example, the guide rails 530 and rail followers 532 cooperate to constrain movement of the shuttle (element 510) to translational movement and maintain a snug coupling between the shuttle and the nozzle base that enhances engagement of a translation gasket between the nozzle base 504 and the shuttle. An example translation gasket 544 is shown in FIGS. 5C, 5D, and is nipped or snuggly coupled between the nozzle base 504 and the element 510 (the shuttle) through cooperative coupling of the guide rails 530 and rail followers 532.

Figure 5C:
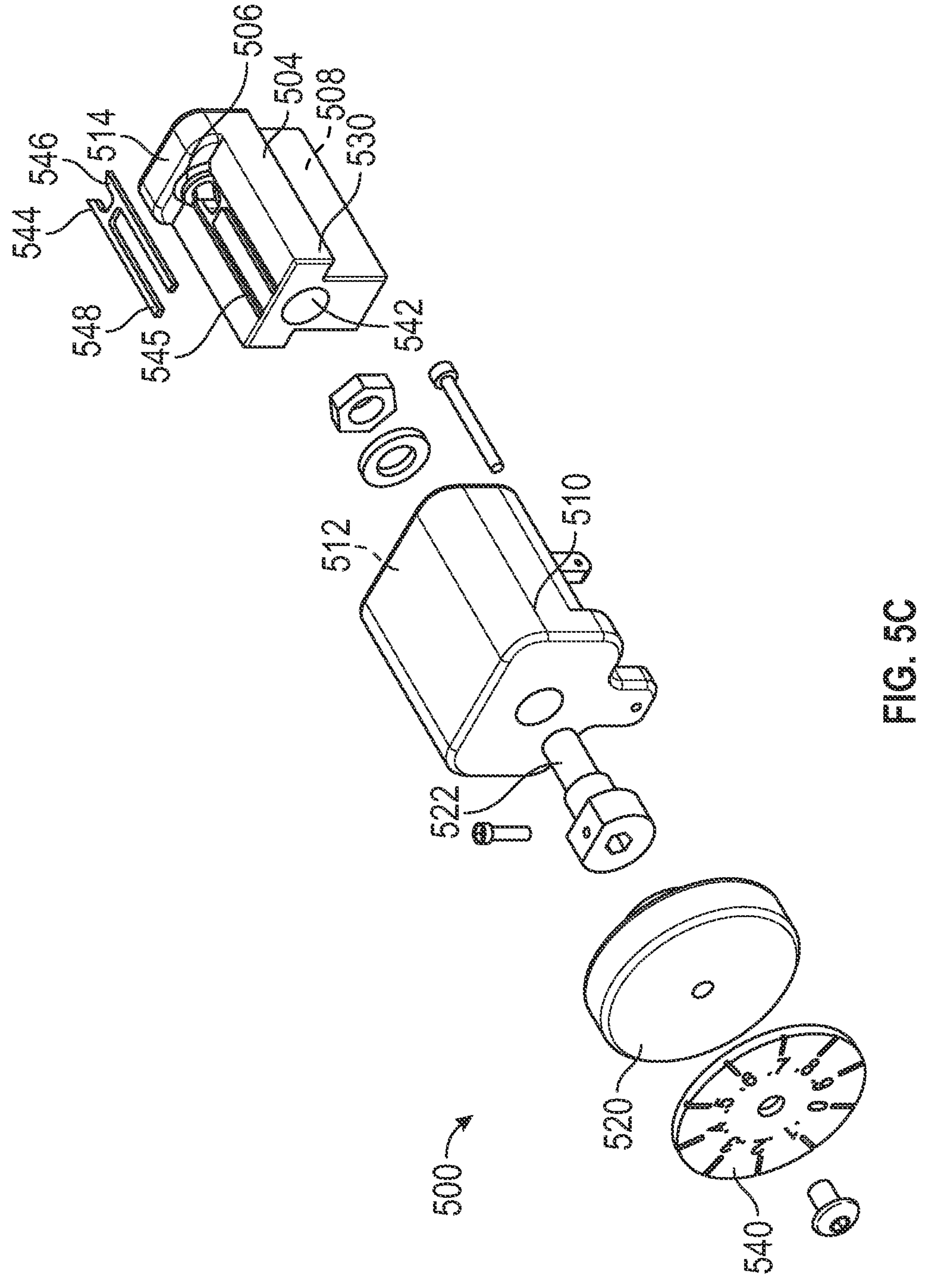
FIG. 5C is an exploded view of the modulating nozzle assembly of FIG. 5A.

FIG. 5C is an exploded view of the example modulating nozzle assembly 500. The nozzle base 504 is decoupled from the spray modulating element 510, a shuttle in this example, to reveal the features of the base 504 and element 510 that are movably coupled together when assembled. For instance, the translation gasket 544 is shown including an elastomeric material, such as rubber, butyl rubber or other sealing material. The translation gasket 544 is received within a gasket recess 545 provided on either or both of the nozzle base 504 or the element 510. When assembled, the translation gasket 544 is snugly coupled between the element 510 and the nozzle base 504. For example, a sealing portion 546 of the translation gasket 544 extends around a portion of the passage extending from the input fitting 508 to the spray sport 502. In one example, the translation gasket includes one or more anchor strips 548. The one or more anchor strips 548 include one or more of a ribbon, tape, band, flange or the like) extending from the sealing portion 546. The element 510 and the nozzle base 504 nip the anchor strip 548 (and the sealing portion) therebetween, and the nipped anchor strip 548 and sealing portion 546 minimize wrinkling, unseating, peeling or the like of the translation gasket 544 with relative movement of the modulating element 510 and the at the same time retain the sealing portion 546 in the specified orientation to minimize leaking between the element and the base, for instance with the modulating element 510 in various positions relative to the nozzle base 504. In another example, the translation gasket 544 decreases leaking between the modulating nozzle element 510 and the nozzle base 504 and instead ensures the agricultural product directed to the modulating nozzle assembly 500 is sprayed from the spray port 502.

The modulating nozzle assembly 500 shown in FIG. 5C further includes a modulation actuator 522 that controls the position of the spray modulating element 510. The modulation actuator 522 is coupled between the spray modulating element 510 and the nozzle base 504. The modulation actuator 522 conducts controlled movement of the the spray modulating element 510 (e.g., the shuttle) relative to the nozzle base 504 to accordingly modulate the spray port 502 (see FIG. 5A). In one example, the modulation actuator 522 includes a rotatable shaft extending between the spray modulating element 510 and the nozzle base 504. For instance, a portion of the modulation actuator (a shaft in this example) is received in the nozzle base 504, for instance in a shaft socket 542. The shaft socket 542 rotatably supports the actuator 522.

In another example, the modulation actuator 522 includes one or more of a screw drive, worm drive, piston, rack and pinion, multi-bar linkage or the like configured implement movement of the spray modulating element 510 relative to the nozzle base 504. In one example, the modulation actuator 522 includes a threaded shaft rotatably relative to the spray modulating element 510. The spray modulating element 510 includes a complementary threaded fitting, such as a nut or the like. Rotation of the threaded shaft of the modulation actuator 522 is conducted relative to the threading of the spray modulating element 510, and the element 510 correspondingly translates along the threaded shaft in the manner of a screw drive. Opposed rotation of the modulation actuator 522 translates the element 510 in an opposed direction. Conversely, maintaining the modulation actuator 522 static holds the spray modulating element 510 static and thereby maintains the spray port 502 in a specified spray port profile (e.g., size, shape or both). In another example, the one or more guide rails 530, rail followers 532 or the like snugly retain the spray modulating element 510 in the orientation shown in FIGS. 5A and 5B and ensure each of the shuttle edge 512 (of the spray modulating element 510) and the base edge 506 that form the perimeter of the spray port 502 are held in a consistent and reliable manner. Further, the guide rails 530, 532 cooperatively guide movement of the spray modulating element 510 conducted with the modulation actuator 522 to maintain the resulting spray port 502 in a specified orientation and profile.

In another example, the modulating nozzle assembly 500 includes an indicator 540. In a manual example, the indicator 540 notes the relative position of the spray modulating element 510. In another example the indicator 540 includes a position sensor, such as an encoder, optical encoder, or the like, that monitors the position of the spray modulating element 510 (e.g., the shuttle) or port profile of the spray port 502 and relays that information to the nozzle controller (e.g., 122 in FIG. 1 or nozzle controller 904 in FIG. 9), for instance to facilitate feedback control of one or more of the element position or the spray port profile.

Figure 6:
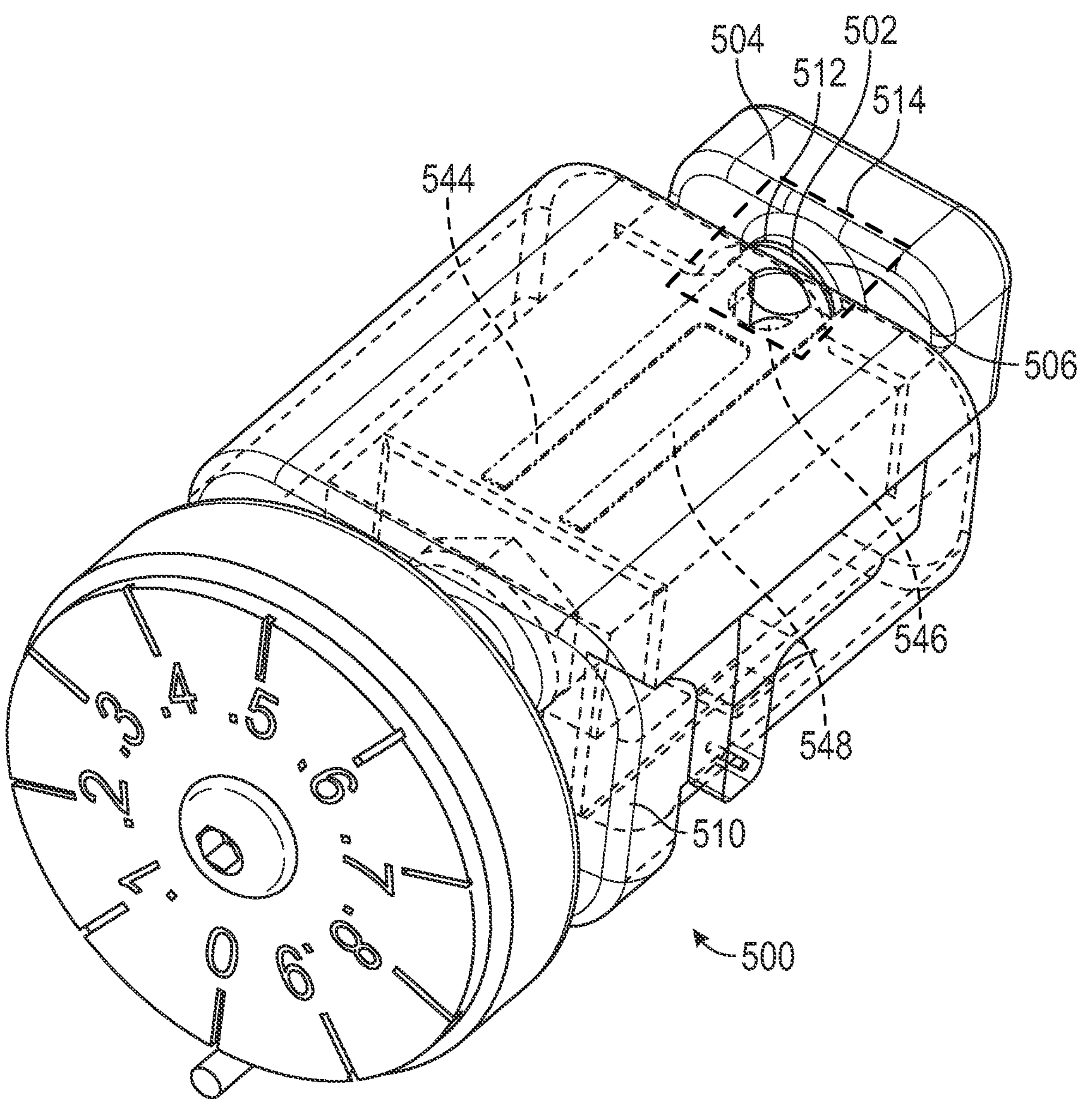
FIG. 6 is another perspective view of the modulating nozzle assembly of FIG. 5A.

FIG. 6 is a perspective view of the modulating nozzle assembly 500 in an assembled configuration and is inverted to show the spray port 502 and the translation gasket 544. The translation gasket 544 is shown in dashed lines interposed between portions of the nozzle base 504 and the spray modulating element 510. In this view the anchor strip 548 (e.g., two anchor strips 548) coupled between elongate portions of the base 504 and the spray modulating element 510. The anchor strips 548, nipped between these components, maintain the translation gasket 544 in the position shown and accordingly maintain the sealing portion 546 in a position surrounding the spray port 502. For instance, the sealing portion 546 is positioned proximate to the base edge 506 of the spray port 502, and extends between the proximate interface of the nozzle base 504 with the opposed portion of the spray modulating element 510. Accordingly, as the spray modulating element 510 is moved relative to the nozzle base 504, the sealing portion 546 remains coupled proximate to the spray port 502 and the interface between the nozzle base and the spray modulating element 510 remains sealed with intervening sealing portion 546.

Figure 7A:
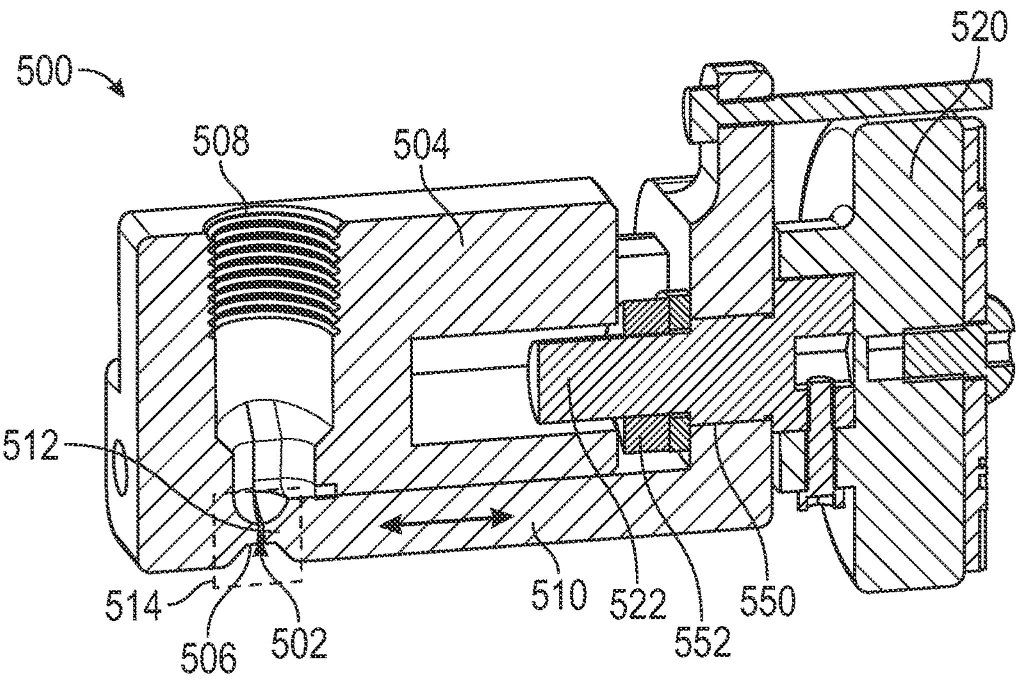
FIG. 7A is a cross sectional view of the modulating nozzle assembly of FIG. 5A in a first open configuration.
Figure 7B:
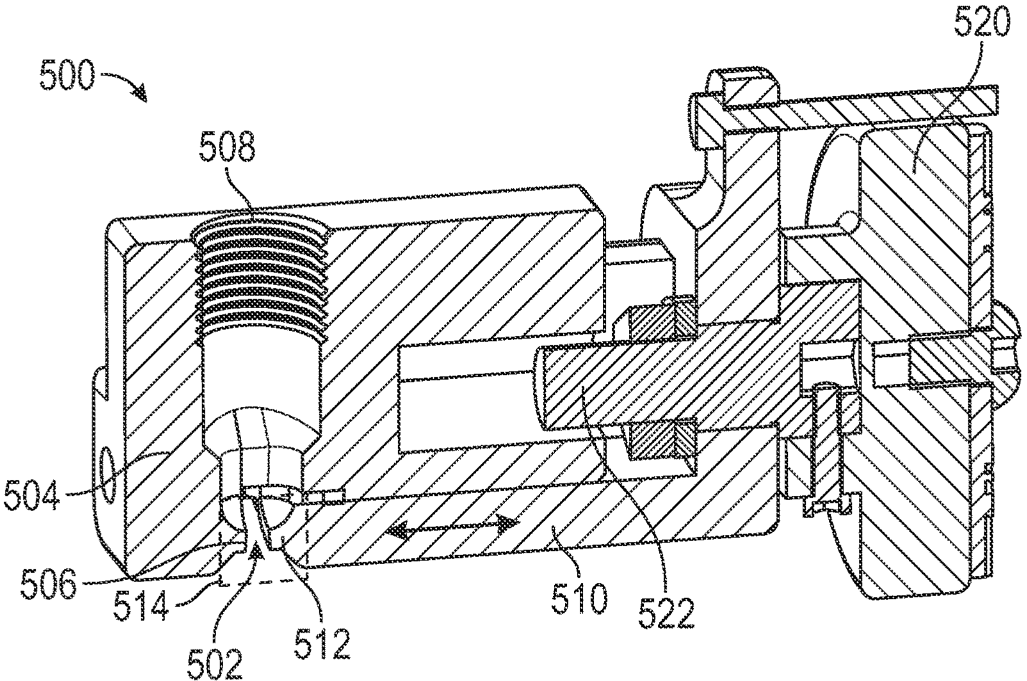
FIG. 7B is a cross sectional view of the modulating nozzle assembly of FIG. 5A in a second open configuration.

Referring now to FIGS. 7A and 7B, the modulating nozzle assembly 500 is shown in respective first and second open configurations illustrating the spray port 502 with respectively different first and second spray port profiles. Referring first to FIG. 7A, the spray port 502 has a first (open) spray port profile shown with the spray modulating element 510 (in this example a shuttle) having the shuttle edge 512 proximate to the base edge 506 of the nozzle base 504. In this example of the first open configuration, the modulating nozzle assembly 500 and its spray port having the illustrated first spray port profile generates smaller spray droplet sizes than the second open configuration (with pressure and flow rate remaining the same or similar).

As shown in FIG. 7B, the spray modulating element 510 is in a second open configuration relative to FIG. 7B. For instance, the shuttle modulating element 510 and its shuttle edge 512 are retracted from the base edge 506 of the nozzle base 504. The second (open) spray port profile of the spray port 502 is accordingly expanded (larger) and the spray droplets generated from the spray port 502 have smaller droplet sizes than in the first open configuration (with pressure and flow rate remaining the same or similar). In other examples, with variations in one or more of pressure, flow rate, specified droplet size or the like the spray port 502 is expanded or contracted with the spray modulating element 510 to provide the specified droplet size while also delivery the agricultural product at the specified flow rate and pressure. The modulating nozzle assembly 500 controls the spray port profile of the spray port 502 to accommodate various flow rates, pressures or the like of the agricultural product while at the same time spraying the agricultural product at a specified droplet size (including range of sizes).

In other examples, the spray modulating element 510 is movable to one or more of a closed spray port profile, for instance with the base edge 506 and shuttle edge 512 engaged (or engaged with a gasket), or intermediate spray port profiles (e.g., between fully open and closed).

Positioning of the shuttle edge 512 relative to the base edge 506 for the first spray port profile of the spray port 502 achieved with movement of one or more spray modulating elements 510 to position the associated shuttle edges 512 relative to the base edge 506. In the example shown in FIG. 7A a single spray modulating element 510 is illustrated. In other examples, opposed spray modulating elements 510 having associated shuttled edges 512 are optionally moved relative to each other (e.g., toward or away).

The operator 520 coupled with the modulation actuator 522 that is coupled with the spray modulating element 510 controls movement (including maintenance of position) of the element 510 and its shuttle edge 512. As discussed herein, the operator 502 includes one or more of a knob, dial, motor or the like (e.g., manual or automated operators). In an example including a motor operator 502, such as a stepper or servo motor, hydraulic actuator, pneumatic actuator or the like, the operator 502 is in communication with a control system, such as the nozzle controller 904 shown in FIG. 9 (or 122 shown in FIG. 1). The nozzle controller 904 provides control instructions to the operator 502 to accordingly conduct one or more of movement, maintenance of position or the like that positions the shuttle edge 512 relative to the base edge 506 and thereby controls the spray port profile of the spray port 502.

In the example shown in FIGS. 7A, 7B, the operator 502 is interconnected with the spray modulating element 510 with a modulation actuator 522 configured to translate movement of the operator 502 to movement of the spray modulating element 510. As discussed herein, the modulation actuator 522 includes one or more shafts, fittings, mechanisms or the like, such as a screw drive, worm drive, piston, rack and pinion, multi-bar linkage or the like configured to control the position of the spray modulating element 510. In the example shown in FIGS. 7A, 7B the modulation actuator 522 includes a shaft coupled with the operator 520, and rotation of the operator 520 accordingly rotates the shaft.

In an example, the spray modulating element 510 includes one or more features complementary to the shaft. For instance, the modulation actuator 522 (a shaft in this example) is threaded and the spray modulating element 510 includes complementary threading. As the modulation actuator 522 is rotated the spray modulating element 510 (shuttle in this example) is translated according to the interfit threading of the actuator 522 and the element 510. Rotation of the actuator 522 in an opposed direction accordingly translates the spray modulating element 510 in an opposed direction. With the actuator 522 in a static configuration (e.g., not rotated, passively or actively held static or the like) the interfit threading holds the spray modulating element 510 in its present position and accordingly maintains the spray port 502 (formed by the shuttle edge 512 and the base edge 506) at its present spray port profile, such as size or shape. Optionally, the spray modulating element 510 includes threading along a shuttle passage 550 extending through the element 510. The modulation actuator 522 includes the complementary threading coupled with the threading of the element 510. In another example, the spray modulating element 510 includes a transmission feature 552, such as a nut, lug or the like, having the threading, and the feature is coupled with the modulating element 510. Translation of the transmission feature 552 (e.g., through rotation of the modulation actuator 522) is transmitted to the spray modulating element 510 to correspondingly move the element 510 and its shuttle edge 512 relative to the nozzle base 504 and its base edge 506.

Figure 8A:
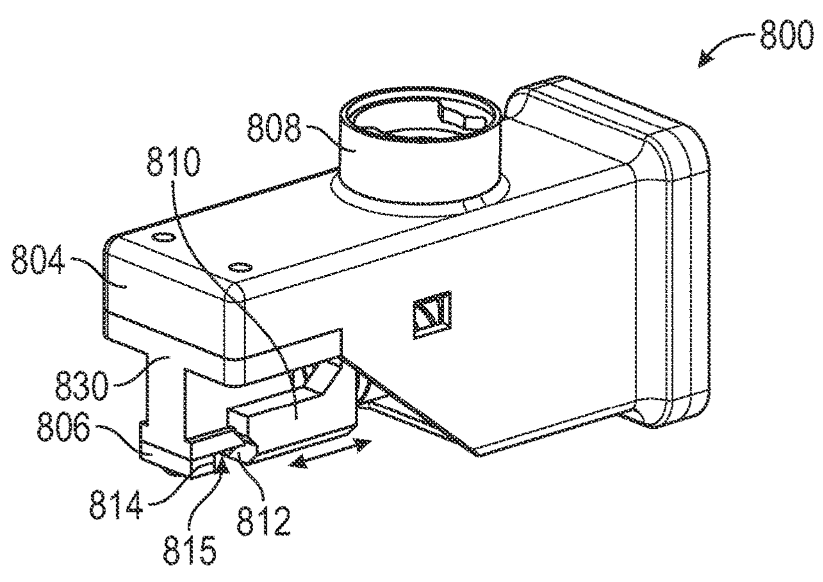
FIG. 8A is a perspective view of another example of a modulating nozzle assembly.
Figure 8B:
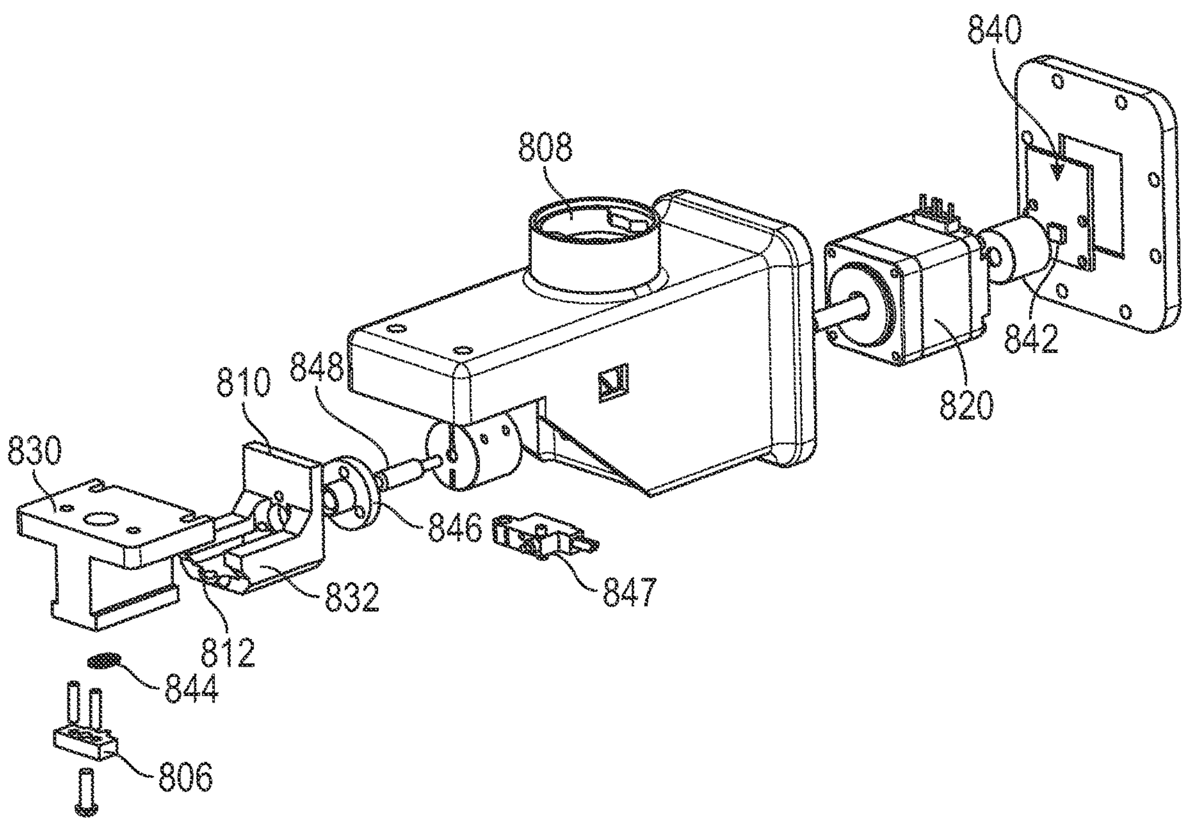
FIG. 8B is an exploded view of the modulating nozzle assembly of FIG. 8A.

FIGS. 8A and 8B are respectively perspective and exploded views of another example of a modulating nozzle assembly 800 including an operator 820, such as a stepper motor, servo motor, hydraulic actuator, pneumatic actuator or the like. Optionally the operator 820 includes a transmission (e.g., a worm transmission or the like) to vary the orientation of the operator 820, step up power, or step down power. Additionally, the example modulating nozzle assembly includes a nozzle controller 840, such as an electronic control unit (ECU), processor, processor on a board or the like interconnected with the operator 820 to permit automated control of the spray port profile. The nozzle controller 840 shown in FIG. 8B corresponds to the nozzle controller 904 shown in FIG. 9. The nozzle controller 840 is interconnected with the operator 820 to permit automated control of the spray port profile of the spray port 815. A position sensor 842 is optionally provided with the assembly 800. In the example shown in FIG. 8B the position sensor 842 is interposed between the nozzle controller 840 and the operator 820. The position sensor 842 includes, but is not limited to, a magnetic encoder, optical encoder or the like that counts or measures rotation of the operator 820 and thereby determines the position of the spray modulating element 810 and the corresponding modulating port profile. In another example, a limit switch 847 is included, and permits calibration of the spray modulating element 810 and the associated modulating port profile. For instance, an initial position of the spray modulating element 810 is readily determined with a specified actuation at machine startup and detection of element 810 position during that specified actuation with the limit switch 847 (e.g., detection by the limit switch indexes a fully open or fully closed position for the element 810).

The modulating nozzle assembly 800 includes features and elements similar in some regards to the assembly 500 shown in FIGS. 5A-5C. For example, the modulating nozzle assembly 800 includes a nozzle base 804 and one or more input fittings 808. A spray modulating element 810, such as a shuttle (e.g., block, plate, shuttle or the like) is movably coupled with the nozzle base 804. Each of the spray modulating element 810 and the nozzle base 804 include respective shuttle and base edges 812, 806. The base edge 806 and the shuttle edge 812 form at least a portion of the perimeter of the spray port 815. Accordingly, movement of one or both of the base edge 806 or shuttle edge 812 relative to the other edge controls the spray port profile (e.g., size or shape of the spray port 815).

The modulating nozzle assembly 800 further includes a guide rail 830 movably coupled with a rail follower 832 of the spray modulating element 810. In the example shown in FIG. 8B, the guide rail 830 is separable component of the remainder of the nozzle base 840, for instance to permit replacement of one or more of the rail 830, the associated base edge 806 or the like. In another example, the guide rail 830 is an integral component to the nozzle base 840 (in a similar manner to the modulating nozzle assembly 500). The rail follower 832 of the spray modulating element 810 includes one or more of a complementary recess, groove or the like coupled with the guide rail 830. The rail follower 832 and guide rail 830 in combination guide movement of the spray modulating element 510, for instance between various open, closed and intermediate spray port profiles.

In the example assembly 800 shown in FIG. 8B, the base edge 806 is a replaceable component of the nozzle base 830. For instance, the base edge 806 is a fitting, insert or the like configured for coupling with the remainder of the nozzle base 830, such as guide rail 830. The base edge 806 is replaceable (along with the spray modulating element) to address wear, failure or the like without requiring replacement of the entire modulating nozzle assembly 800. In another example, the base edge is integral to the guide rail 830 and both are replaced at the same time.

Referring again to FIG. 8B, an actuator 848 is coupled with the operator 820. The actuator 848 is, in this example, a shaft that transmits rotation from the operator 820 to the spray modulating element 810 to thereby translate the spray modulating element 810. The spray modulating element 810 includes a complementary fitting (e.g., threading) or a transmission feature 846, such as a nut, lug or the like, having threading. The threading of either or both of the element 810 or the transmission feature 846 are interfit with complementary threading of the actuator 848. Accordingly, rotation of the actuator 848 (e.g., conducted by the operator 820) causes translation of the spray modulating element 810.

In another example, the modulating nozzle assembly 800 includes a translation gasket 844. As shown in FIG. 8B (and shown in FIGS. 8D, 8F), the translation gasket 844 is installed in the base rail 830 and surrounds the input passage 850 (FIGS. 8D and 8F) extending to the spray port 815. The translation gasket 844 bridges a gap between the nozzle base 804 and the spray modulating element 810 and decreases leaking from between the base 804 and element 810, and instead ensures flow of the agricultural product to the spray port 502. The translation gasket 844 bridging the gap provides a snug sliding interface between the nozzle base 804 and the spray modulating element 810.

Figure 8C:
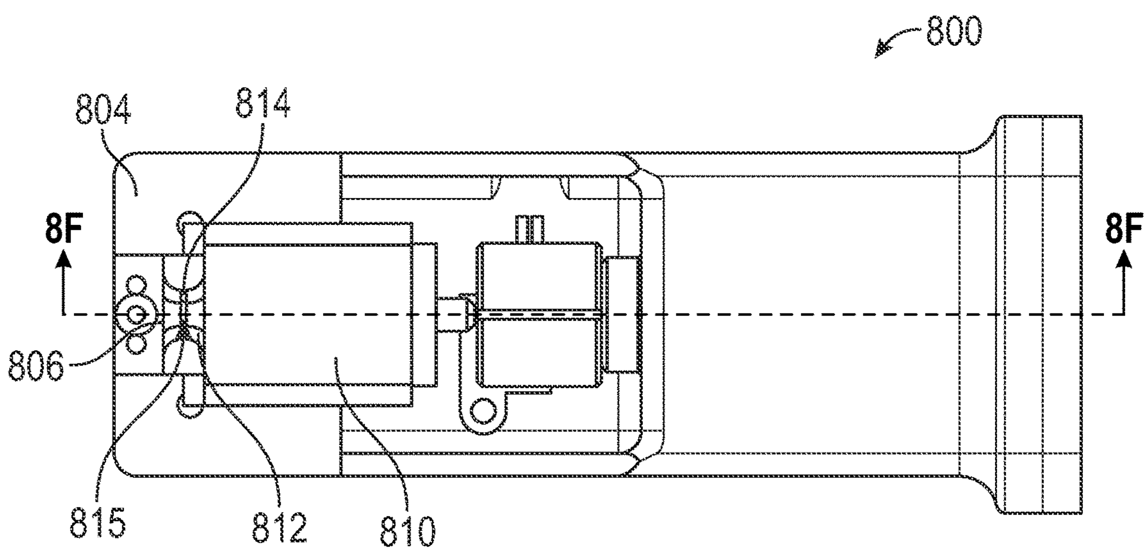
FIG. 8C is a bottom view of the modulating nozzle assembly of FIG. 8A in a first open configuration.
Figure 8D:
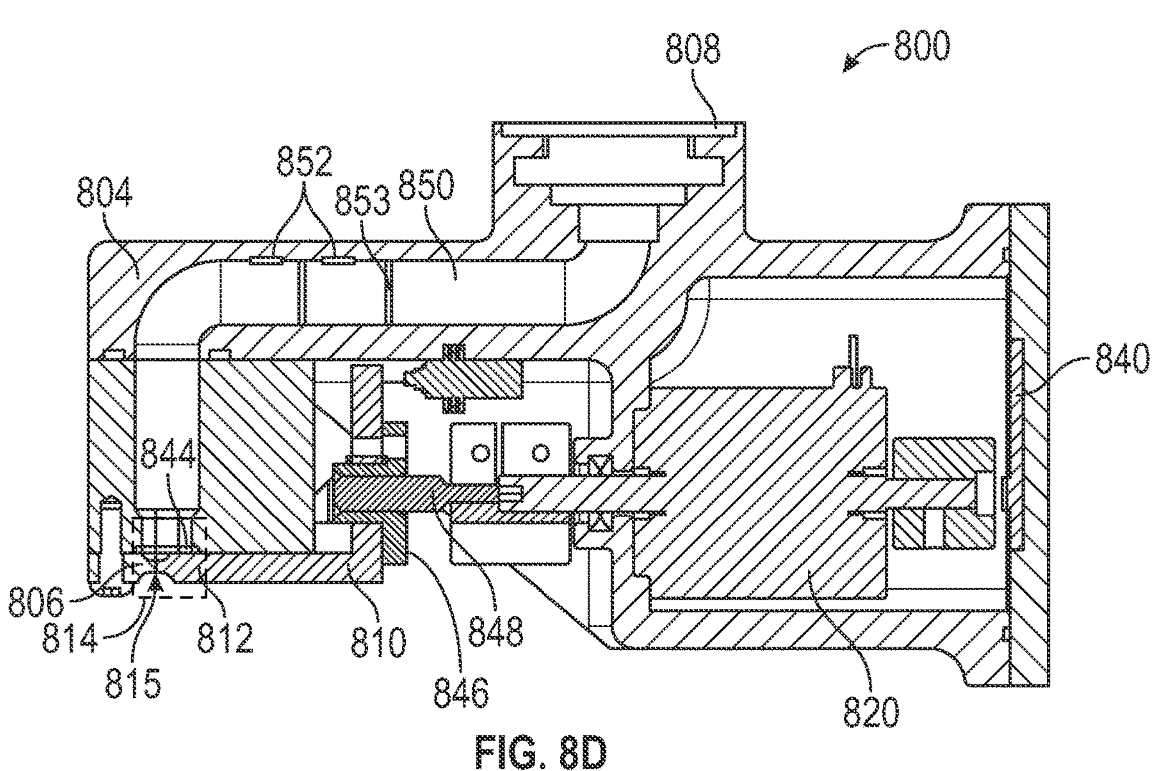
FIG. 8D is a sectional view of the modulating nozzle assembly of FIG. 8C.

FIGS. 8C and 8D show respective bottom and sectional views of the modulating nozzle assembly 800. Referring first to FIG. 8C the spray port 815 is shown with a first open profile bounded by the shuttle edge 812 of the spray modulating element 810 and the base edge 806 of the nozzle base 804. The spray port 815 is shown in the first open profile in FIG. 8D as part of the spray tip 814 including the features of the nozzle assembly 800 extending around and forming the contour of the port 815. In the first open profile sprayed agricultural product has a specified droplet size (including a range of sizes) smaller than the droplet size generated with the assembly 800 in the second open profile shown in FIGS. 8E and 8F (with flow rate and pressure staying the same or similar). Optionally, one or both of the base edge 806 or the shuttle edge 812 is deformable, for instance having a rubber lip or flange. With movement of the spray modulating element 810 toward the base edge 806 the shuttle and base edges 812, 806 engage and close the spray port 815 of the modulating nozzle assembly 800.

The translation gasket 844 is shown between the nozzle base 804 and the spray modulating element 810. The coupling of the spray modulating element 810 with the nozzle base 804 engages (or nips) the translation gasket 844 therebetween. Accordingly, agricultural product delivered from the input fitting 808 to the spray port 815 has decreased leaking (including no leaking) even with movement of the spray modulating element 810 relative to the nozzle base 804.

Figure 8E:
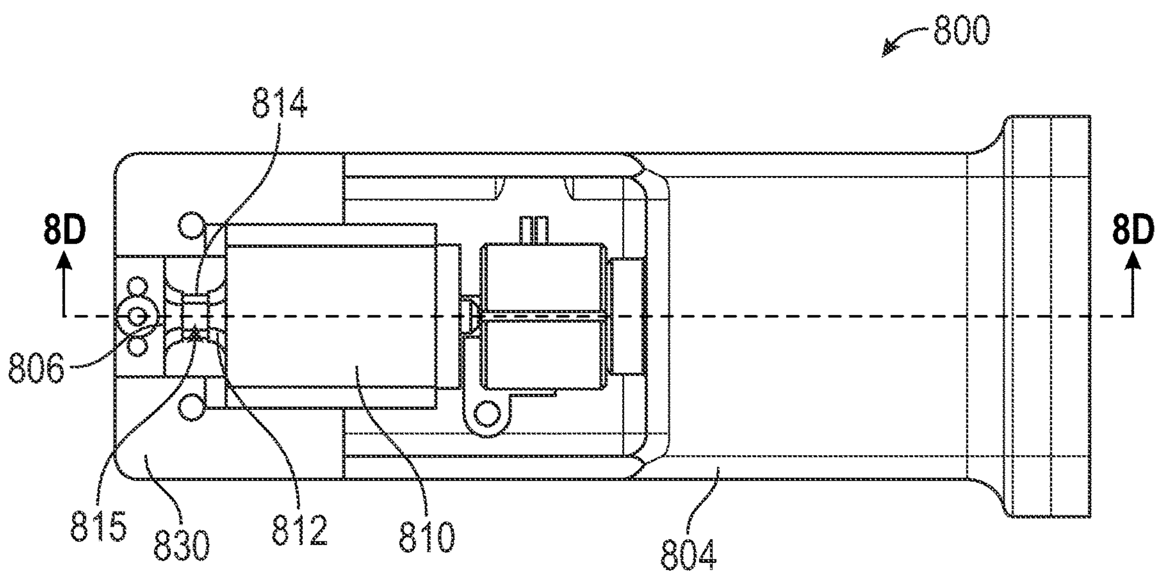
FIG. 8E is a bottom view of the modulating nozzle assembly of FIG. 8A in a first open configuration.
Figure 8F:
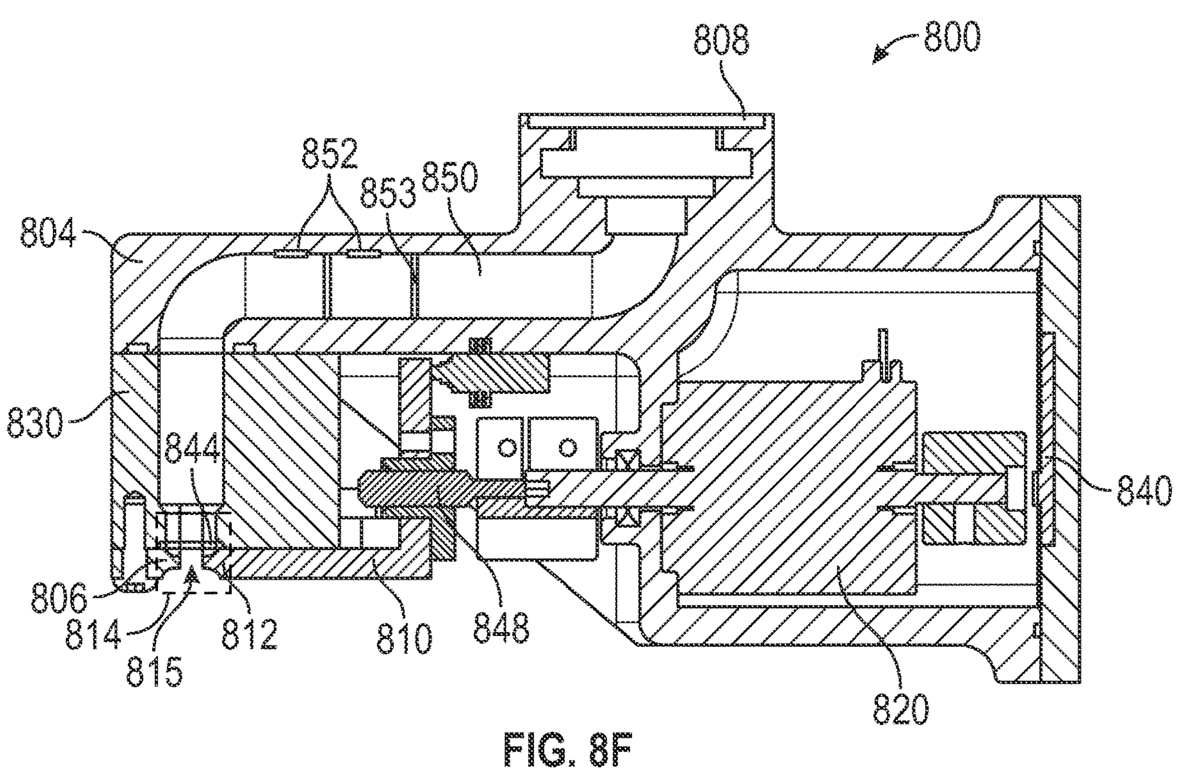
FIG. 8F is a sectional view of the modulating nozzle assembly of FIG. 8E.

Referring now to FIGS. 8E and 8F the modulating nozzle assembly 800 is shown with the spray port 815 having a second open profile. In this example, the spray modulating element 810 is retracted relative to the position shown in FIGS. 8C and 8D. The shuttle edge 812 is spaced from the base edge 806 thereby expanding the spray port 815. Movement of the spray modulating element 810 is controlled by the operator 820 and the actuator 848, as described herein. For instance, the operator 820 rotates the actuator 848 in a first direction to move the spray modulating element 810 from the position shown in FIG. 8D to the position in FIG. 8F. Conversely, rotation in of the actuator 848 in an opposed second direction moves the spray modulating element from the position in FIG. 8F (corresponding to the second open profile) to the position in FIG. 8D (the first open profile). The spray port 815 of the spray tip 814 of the modulating nozzle assembly 800 is thereby movable to one or more of various open profiles, intermediate profiles therebetween, and in some examples to a closed profile (e.g., with the base and shuttle edges 806, 812 closing the spray port 815).

In another example, the modulating nozzle assembly 800 includes one or more sensors, such as the position sensor 842 (previously discussed and shown in FIG. 8B) and an agricultural product monitor 852, 853. In one example, the agricultural product monitor 852 includes one or more pressure transducers that measure a pressure differential. An orifice is interposed between the pressure transducers, shown with two vertical lines in the input passage 850. The orifice causes a pressure drop between the pressure transducers and the pressure transducers measure the pressure differential. The pressure differential corresponds to a flow rate. The agricultural product monitor 852 including the pressure transducers permits flow rate measurements in lower flow rate circumstances. Additionally, the pressure transducers permit the measurement of the pressure of the agricultural product (e.g., a pressure setpoint). In other examples, the agricultural product monitor 853 includes a flow sensor, such as a flow meter that measures the flow rate in the input passage 850. The flow sensor in this example includes, but is not limited to, inferential, electromagnetic, positive displacement, fluid dynamic, anemometer, ultrasound, mass flow types of sensors or the like.

The one or more sensors 842, 852, 853 are in communication with one or more elements of the nozzle control system 900, such as the nozzle controller 904 (FIG. 9) or nozzle controller 122 (FIG. 1). The monitored characteristics of the sensors 842, 852, 853 are optionally inputs to the controllers to permit analysis of the performance of the modulating nozzle assembly 800 and control (e.g., feedback control) components of the assembly 800, such as the spray modulating element 810 and the spray port profile of the spray port 815. For instance, as one or more of flow or pressure of the agricultural product are changed (e.g., based on prescription, operator instructions or the like) the changes in either or both of these characteristics are sensed with the sensors 852, 853 and provide as inputs to the nozzle controller 904 to conduct control of the spray modulating element 810 to provide a corresponding spray port 815 that provides a specified droplet size. In another example, in a circumstance with the prescription or operator changing the specified droplet size, for instance from fine to ultrafine, or coarse to fine, one or more of flow or pressure are inputs to the nozzle controller 904 that conducts control of the spray modulating element 810 to set the spray port profile (based in part on flow rate or pressure) of the spray port 815 that generates the specified droplet size. FIG. 9 is a schematic view of one example of a nozzle control system 900.

The nozzle control system 900 includes a nozzle controller 904 in communication (e.g., wired, wirelessly or the like) with one or more modulating nozzle assemblies, such as the assemblies 902 (or 500, 800 described herein). As described herein, the nozzle controller 904 provides control instructions 910 to the one or more modulating nozzle assemblies 902. For instance, control instructions actuate the modulating nozzle assemblies 902 to maintain a specified spray profile, including for example a specified droplet size, in a manner that compensates for changes in one or more of flow rate or pressure of the agricultural product that would otherwise cause variation in the spray profile (including droplet size). Changes in flow rate or pressure are caused, for example, by changes in speed of the agricultural vehicle, turning of the agricultural vehicle with distal (outside) nozzle assemblies having a greater speed (and flow rate) than nozzle assemblies nearer (inside) relative to the locus of the turn. In other examples, the control instructions actuate the modulating nozzle assemblies 902 to vary the actual spray profile emanated by the assemblies 902, for instance because of a change in application prescription (e.g., including a change in droplet size), change in field conditions (increased winds, humidity or the like), or because of operator overriding of a specified spray profile.

The nozzle controller 904, the associated control instructions 910 and the modulating nozzle assembly 902 shown in FIG. 9 include one or more spray modulating elements, associated modulators (in the controller 904) and associated control instructions. Examples of the various spray modulating elements are shown and described in the Figures herein. Referring to FIG. 3, the modulating nozzle assembly 300 includes a modulating spray tip 340 (930 in FIG. 9), having a modulating orifice of the types described herein. Additionally, the modulating nozzle assembly 300 includes other example spray modulating elements, such as, but not limited to, a modulating accumulator 342 (936 in FIG. 9) that dampens pressure changes, gas inductor 344 (934) that supplements a secondary fluid (e.g., air) to the agricultural product, or control valve 304 (e.g., a pulse width modulating valve provide a pre-orifice 932). Each of these elements, including the modulating spray tip 340, permits control of the spray profile of the modulating nozzle assembly 300. The nozzle controller 904 provides the corresponding control instructions 910 for actuation of these elements of the modulating nozzle assembly 904. In various examples, the modulating nozzle assembly 904 includes fewer than each of these modulating spray elements, for instance, an example assembly includes the modulating nozzle tip 930.

The modulating nozzle assembly 902 generates an actual (controlled) spray output 912. This spray output 912 is, in one example, monitored with one or more spray sensors 914 (e.g., spray sensor 124 shown in FIGS. 1 and 2). The spray sensor 914 observes and permits the detection and identification of the actual spray output 912, including the actual spray profile, such as spray pattern, droplet size, kinematics or the like (see 918 in FIG. 9). For instance, the nozzle assembly controller 904 (or controller 122 in FIG. 1) includes one or more of an identification module or tracking module that identifies droplets and tracks droplets to determine droplet (and spray) kinematics.

A comparator 922 compares the actual spray profile (e.g., one or more of identified droplets or tracking 918) with a specified spray profile 906 including specified droplet sizes, kinematics, spray pattern or the like. The comparator 922 determines associated deviations 920 between the specified and actual spray profiles and provides the deviations 920 to the nozzle controller 904 for generation of the control instructions 910. The nozzle control system 900, in this example, thereby includes a feedback loop 916 to permit automated control of the one or more modulating nozzle assemblies 902 based on a specified spray profile and actual spray profile.

In a first example, the nozzle control system 900 conducts maintenance of droplet size (fine, coarse or the like), including a range of droplet sizes by compensating for changes in one or more of flow rate, pressure or the like. Changes in flow rate are monitored (e.g., with one or more of the agricultural product monitors 852, 853) provided with the modulating nozzle assembly 902 or with monitors provided with agricultural vehicle plumbing upstream from the nozzle assembly 902. In some circumstances, changes in one or more of flow rate or pressure without a change in port profile cause the actual spray profile to change. For instance, droplet size decreases with one or both of greater flow or increased pressure. In a first example, the change in one or more of flow rate or pressure is an input to the nozzle controller 904. Optionally, spray deviation (e.g., droplet size variation relative to the specified spray profile 906) is monitored with the spray sensor 124 and determined with the nozzle controller. As one or both of flow or pressure increases, the nozzle controller 904 proportionally increases the port profile (e.g., applies a gain) by way of actuator of the modulating nozzle tip 930 (e.g., including a shutte); and as flow decreases, the nozzle controller 904 proportionally decreases the port profile (applies an inverse gain) with actuation of the modulating nozzle tip 930; thereby maintaining the specified droplet size, for instance of a specified spray profile 906. Optionally, the change in droplet size caused by one or both of flow rate or pressure changes is detected with the spray sensor 124 and the droplet deviation (in contrast to flow change) is provided to the nozzle controller 904 to change the port profile and guide droplet size toward the specified droplet size of the specified spray profile 906.

In another example, changes in actual spray output 912 are monitored, for instance with the spray sensor 124. Deviation from a specified droplet size (including a range of droplet sizes) of the specified spray profile 906 is provided to the nozzle controller 904 and the port profile is modulated (e.g., the shuttle is moved) in a manner corresponding to the detected deviation, such as a gain, to guide actual droplet size toward the specified droplet size.

In an additional example, droplet size is change. For instance, one or more of flow or pressure are constant (or change), and a droplet size change is specified by one or more of a change in application prescription (the vehicle is in different zone having a different prescription), variation in conditions such as increased or decreased wind speed are detected (or observed by an operator). A specified change in the specified spray profile 906 droplet size (e.g., as part of an updated specified spray profile) is provided to the nozzle controller 904 and the nozzle controller 904 actuates the spray modulating element 930 (e.g., a shuttle) to change the port profile to generate the presently specified droplet size.

Various Notes and Aspects

Aspect 1 can include subject matter such as a modulating nozzle assembly for use with an agricultural sprayer, the modulating nozzle assembly comprising: a nozzle base, the nozzle base includes a base edge; a shuttle movably coupled with the nozzle base, the shuttle includes a shuttle edge; a spray port between the nozzle base and the shuttle, the spray port includes a modulating port profile, and the modulating port profile is formed by the: the base edge; and the shuttle edge; and a modulation actuator coupled with the shuttle, the modulation actuator is configured to move one or more of the shuttle edge or the base edge relative to the other of the base edge or the shuttle edge to control the modulating port profile.

Aspect 2 can include, or can optionally be combined with the subject matter of Aspect 1, to optionally include wherein the modulating port profile includes each of an open profile, a closed profile and intermediate profiles therebetween.

Aspect 3 can include, or can optionally be combined with the subject matter of one or any combination of Aspects 1 or 2 to optionally include an operator coupled with the modulating actuator.

Aspect 4 can include, or can optionally be combined with the subject matter of one or any combination of Aspects 1-3 to optionally include wherein the operator includes one or more of a stepper motor, a servo motor, a hydraulic actuator, a pneumatic actuator or the like.

Aspect 5 can include, or can optionally be combined with the subject matter of one or any combination of Aspects 1-4 to optionally include a nozzle controller in communication with the operator.

Aspect 6 can include, or can optionally be combined with the subject matter of Aspects 1-5 to optionally include wherein one of the nozzle base or the shuttle includes at least one guide rail and the other of the shuttle or the nozzle base includes at least one rail follower coupled with the at least one guide rail, wherein the at least one guide rail and at least one rail follower cooperate to constrain movement of the shuttle to translational movement.

Aspect 7 can include, or can optionally be combined with the subject matter of Aspects 1-6 to optionally include a translation gasket interposed between the shuttle and the nozzle base, wherein the translation gasket is configured to seal the spray port with the modulating port profile in an open position, a closed position and intermediate positions therebetween.

Aspect 8 can include, or can optionally be combined with the subject matter of Aspects 1-7 to optionally include wherein the translation gasket includes: a sealing portion coupled around the spray port; an anchor strip extend from the sealing portion; and wherein the nozzle base and the shuttle nip the anchor strip therebetween.

Aspect 9 can include, or can optionally be combined with the subject matter of Aspects 1-8 to optionally include wherein the shuttle includes at least one input fitting configured to communicate with one or more boom tubes of an agricultural sprayer.

Aspect 10 can include, or can optionally be combined with the subject matter of Aspects 1-9 to optionally include a position sensor configured to monitor one or more of the position of the shuttle or the modulating port profile.

Aspect 11 can include, or can optionally be combined with the subject matter of Aspects 1-10 to optionally include wherein the modulation actuator is coupled between the shuttle and the nozzle base.

Aspect 12 can include, or can optionally be combined with the subject matter of Aspects 1-11 to optionally include wherein the modulation actuator includes one or more a screw drive, a worm drive, a piston and cylinder actuator, rack and pinion actuator or the like.

Aspect 13 can include, or can optionally be combined with the subject matter of Aspects 1-12 to optionally include a spray tip, and the spray tip includes the spray port having the modulating port profile formed with the base edge and the shuttle edge, wherein the spray tip is configured to transition liquid agricultural product to sprayed agricultural product at the spray tip.

Aspect 14 can include, or can optionally be combined with the subject matter of Aspects 1-13 to optionally include a modulating nozzle assembly for use with an agricultural sprayer, the modulating nozzle assembly comprising: a nozzle base; a spray modulating element movably coupled with the nozzle base; a spray port between the nozzle base and the spray modulating element, the spray port includes a modulating port profile formed by the nozzle base and the spray modulating element; a modulation actuator coupled with the spray modulating element; a nozzle controller in communication with the modulating actuator, the nozzle controller configured to control the modulation actuator and accordingly control the modulating port profile; and wherein the modulating port profile includes at least an open profile, a closed profile and at least one intermediate profile therebetween: in the closed profile the spray port is closed relative to the open profile or the at least one intermediate profile; in the open profile the spray port is open and agricultural product sprayed from the spray port has a first spray profile including a first droplet size; and in the at least one intermediate profile the spray port is open and the agricultural product sprayed form the spray port has a second spray profile include a second droplet size less than the first droplet size.

Aspect 15 can include, or can optionally be combined with the subject matter of Aspects 1-14 to optionally include wherein the at least one intermediate profile includes a plurality of intermediate profiles between the closed and open profiles, and spray profiles associated with the intermediate profiles include droplet sizes that increase as the intermediate profiles transition between the closed profile toward the open profile.

Aspect 16 can include, or can optionally be combined with the subject matter of Aspects 1-15 to optionally include wherein the spray modulating element includes one or more of a shuttle, gate, block or plate.

Aspect 17 can include, or can optionally be combined with the subject matter of Aspects 1-16 to optionally include wherein the spray modulating element includes a shuttle having a shuttle edge, and the nozzle base includes a base edge; and wherein the modulating port profile is formed by the shuttle edge and the base edge.

Aspect 18 can include, or can optionally be combined with the subject matter of Aspects 1-17 to optionally include an operator coupled with the modulating actuator, and wherein the nozzle controller in communication with the modulating actuator includes the nozzle controller in communication with the operator.

Aspect 19 can include, or can optionally be combined with the subject matter of Aspects 1-18 to optionally include wherein the operator includes one or more of a stepper motor, a servo motor, a hydraulic actuator, a pneumatic actuator or the like.

Aspect 20 can include, or can optionally be combined with the subject matter of Aspects 1-19 to optionally include one or more spray sensors in communication with the nozzle controller, the one or more spray sensors configured to monitor the agricultural product sprayed from the spray port.

Aspect 21 can include, or can optionally be combined with the subject matter of Aspects 1-20 to optionally include wherein the nozzle controller includes a comparator configured to compare the agricultural product sprayed with a specified spray profile; and the nozzle controller is configured to control the modulation actuator to decrease a deviation between the specified spray profile and the agricultural product sprayed.

Aspect 22 can include, or can optionally be combined with the subject matter of Aspects 1-21 to optionally include wherein the deviation includes one or more of droplet size deviation, droplet kinematic deviation or spray pattern deviation.

Aspect 23 can include, or can optionally be combined with the subject matter of Aspects 1-22 to optionally include wherein the nozzle controller includes: an agricultural product monitor configured to monitor one or more of agricultural product flow rate or agricultural product pressure; and the nozzle controller is configured to control the modulation actuator to maintain a specified droplet size with variations in one or more of the agricultural product flow rate or agricultural product pressure.

Aspect 24 can include, or can optionally be combined with the subject matter of Aspects 1-23 to optionally include wherein the agricultural product monitor is configured to determine changes in one or more of agricultural product flow rate or agricultural product pressure; the nozzle controller configured to control the modulation actuator includes a gain module configured to expand or contract the modulating port profile based on a gain proportional to the determined change of agricultural product flow rate or agricultural product pressure, wherein the expansion or contraction of the modulating port profile maintains the specified droplet size.

Aspect 25 can include, or can optionally be combined with the subject matter of Aspects 1-24 to optionally include a spray tip, and the spray tip includes the spray port having the modulating port profile formed with the nozzle base and the spray modulating element, wherein the spray tip is configured to transition liquid agricultural product to sprayed agricultural product at the spray tip.

Each of these non-limiting aspects can stand on its own, or can be combined in various permutations or combinations with one or more of the other aspects.

The above description includes references to the accompanying drawings, which form a part of the detailed description. The drawings show, by way of illustration, specific embodiments in which the invention can be practiced. These embodiments are also referred to herein as "aspects" or "examples." Such aspects or example can include elements in addition to those shown or described. However, the present inventors also contemplate aspects or examples in which only those elements shown or described are provided. Moreover, the present inventors also contemplate aspects or examples using any combination or permutation of those elements shown or described (or one or more features thereof), either with respect to a particular aspects or examples (or one or more features thereof), or with respect to other Aspects (or one or more features thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method aspects or examples described herein can be machine or computer-implemented at least in part, for instance with one or more processors, associated memory, input and output devices. Some aspects or examples can include a computer-readable medium or machine-readable medium encoded with instructions operable to configure an electronic device to perform methods as described in the above aspects or examples. An implementation of such methods can include code, circuits, code modules, software modules, hardware modules or the like, such as or having microcode, assembly language code, a higher-level language code, hardwiring or the like. Such code can include computer readable instructions for performing various methods. The code may form portions of computer program products or is included in controllers, programmable logic controllers or the like having modules (e.g., circuits, software, subunits or the like) configured to implement the code and perform the various methods. Further, in an aspect or example, the code can be tangibly stored on one or more volatile, non-transitory, or non-volatile tangible computer-readable media, such as during execution or at other times. Aspects or examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), circuits and the like.

The above description is intended to be illustrative, and not restrictive. For example, the above-described aspects or examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as aspects, examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A modulating nozzle assembly for use with an agricultural sprayer, the modulating nozzle assembly comprising:
- a nozzle base, the nozzle base includes a base edge;
- a shuttle movably coupled with the nozzle base, the shuttle includes a shuttle edge;
- a spray port between the nozzle base and the shuttle, the spray port includes a spray port profile, and the spray port profile is formed by the:
  - the base edge; and
  - the shuttle edge;
- wherein the nozzle base includes an input passage extending to the spray port, and the shuttle is isolated from the input passage; and
- a modulation actuator coupled with the shuttle, the modulation actuator is configured to move the shuttle edge relative to the base edge to control the spray port profile.

2. The modulating nozzle assembly of claim 1, wherein the spray port profile includes each of an open profile, a closed profile and intermediate profiles therebetween.

3. The modulating nozzle assembly of claim 1 comprising an operator coupled with the modulating actuator.

4. The modulating nozzle assembly of claim 3, wherein the operator includes one or more of a stepper motor, a servo motor, a hydraulic actuator, or a pneumatic actuator.

5. The modulating nozzle assembly of claim 3 comprising a nozzle controller in communication with the operator.

6. The modulating nozzle assembly of claim 1, wherein one of the nozzle base or the shuttle includes at least one guide rail and the other of the shuttle or the nozzle base includes at least one rail follower coupled with the at least one guide rail, wherein the at least one guide rail and at least one rail follower cooperate to constrain movement of the shuttle to translational movement.

7. The modulating nozzle assembly of claim 1 comprising a translation gasket interposed between the shuttle and the nozzle base, wherein the translation gasket is configured to seal the spray port with the spray port profile in an open position, a closed position and intermediate positions therebetween.

8. The modulating nozzle assembly of claim 7, wherein the translation gasket includes:
- a sealing portion coupled around the spray port;
- an anchor strip extend from the sealing portion; and
- wherein the nozzle base and the shuttle nip the anchor strip therebetween.

9. The modulating nozzle assembly of claim 1, wherein the nozzle base includes at least one input fitting configured to communicate with one or more boom tubes of an agricultural sprayer.

10. The modulating nozzle assembly of claim 1 comprising a position sensor configured to monitor one or more of the position of the shuttle or the spray port profile.

11. The modulating nozzle assembly of claim 1, wherein the modulation actuator is coupled between the shuttle and the nozzle base.

12. The modulating nozzle assembly of claim 1, wherein the modulation actuator includes one or more a screw drive, a worm drive, a piston and cylinder actuator, or rack and pinion actuator.

13. The modulating nozzle assembly of claim 1 comprising a spray tip, and the spray tip includes the spray port having the spray port profile formed with the base edge and the shuttle edge, wherein the spray tip is configured to transition liquid agricultural product to sprayed agricultural product at the spray tip.

14. A modulating nozzle assembly for use with an agricultural sprayer, the modulating nozzle assembly comprising:
- a nozzle base;
- a spray modulating element movably coupled with the nozzle base;
- a spray port between the nozzle base and the spray modulating element, the spray port includes a spray port profile formed by the nozzle base and the spray modulating element;
- a modulation actuator coupled with the spray modulating element;
- wherein the nozzle base includes an input passage extending to the spray port, and the spray modulating element is outside of the input passage;
- a nozzle controller in communication with the modulating actuator, the nozzle controller configured to control the modulation actuator and accordingly control the spray port profile; and
- wherein the spray port profile includes at least an open profile, a closed profile and at least one intermediate profile therebetween:
  - in the closed profile the spray port is closed relative to the open profile or the at least one intermediate profile;
  - in the open profile the spray port is open and agricultural product sprayed from the spray port has a first spray profile including a first droplet size; and
  - in the at least one intermediate profile the spray port is open and the agricultural product sprayed form the spray port has a second spray profile include a second droplet size less than the first droplet size.

15. The modulating nozzle assembly of claim 14, wherein the at least one intermediate profile includes a plurality of intermediate profiles between the closed and open profiles, and spray profiles associated with the intermediate profiles include droplet sizes that increase as the intermediate profiles transition between the closed profile toward the open profile.

16. The modulating nozzle assembly of claim 14, wherein the spray modulating element includes one or more of a shuttle, gate, block or plate.

17. The modulating nozzle assembly of claim 14, wherein the spray modulating element includes a shuttle having a shuttle edge, and the nozzle base includes a base edge; and
- wherein the spray port profile is formed by the shuttle edge and the base edge.

18. The modulating nozzle assembly of claim 14 comprising an operator coupled with the modulating actuator, and wherein the nozzle controller in communication with the modulating actuator includes the nozzle controller in communication with the operator.

19. The modulating nozzle assembly of claim 14, wherein the modulation actuator includes one or more of a stepper motor, a servo motor, a hydraulic actuator, or a pneumatic actuator.

20. The modulating nozzle assembly of claim 14 comprising one or more spray sensors in communication with the nozzle controller, the one or more spray sensors configured to monitor the agricultural product sprayed from the spray port.

21. The modulating nozzle assembly of claim 20, wherein the nozzle controller includes a comparator configured to compare the agricultural product sprayed with a specified spray profile; and
- the nozzle controller is configured to control the modulation actuator to decrease a deviation between the specified spray profile and the agricultural product sprayed.

22. The modulating nozzle assembly of claim 21, wherein the deviation includes one or more of droplet size deviation, droplet kinematic deviation or spray pattern deviation.

23. The modulating nozzle assembly of claim 14, wherein the nozzle controller includes:
- an agricultural product monitor configured to monitor one or more of agricultural product flow rate or agricultural product pressure; and
- the nozzle controller is configured to control the modulation actuator to maintain a specified droplet size with variations in one or more of the agricultural product flow rate or agricultural product pressure.

24. The modulating nozzle assembly of claim 23, wherein the agricultural product monitor is configured to determine changes in one or more of agricultural product flow rate or agricultural product pressure;
- the nozzle controller configured to control the modulation actuator includes a gain module configured to expand or contract the spray port profile based on a gain proportional to the determined change of agricultural product flow rate or agricultural product pressure, wherein the expansion or contraction of the spray port profile maintains the specified droplet size.

25. The modulating nozzle assembly of claim 14 comprising a spray tip, and the spray tip includes the spray port having the spray port profile formed with the nozzle base and the spray modulating element, wherein the spray tip is configured to transition liquid agricultural product to sprayed agricultural product at the spray tip.

* * * * *